United States Patent
Simpson et al.

(10) Patent No.: US 10,755,284 B2
(45) Date of Patent: Aug. 25, 2020

(54) METHOD AND APPARATUS FOR PREPARING, STORING AND RECORDING COMPLIANT RECORDS FOR MOTOR CARRIERS, REGISTRANTS, AND GOVERNMENTAL ORGANIZATIONS

(71) Applicant: LEGATUS SOLUTIONS CORPORATION, Herndon, VA (US)

(72) Inventors: Julian Simpson, Fairfax, VA (US); Joanna Masny, Scottsdale, AZ (US); Michael L Holloman, Scottsdale, AZ (US); Scott R Grzybowski, Fountain Hills, AZ (US); William Joseph Curry, Fairfax, VA (US)

(73) Assignee: LEGATUS SOLUTIONS CORPORATION, Herndon, VA (US)

( * ) Notice: Subject to any disclaimer, the term of this patent is extended or adjusted under 35 U.S.C. 154(b) by 1469 days.

(21) Appl. No.: 14/456,518

(22) Filed: Aug. 11, 2014

(65) Prior Publication Data

US 2015/0178737 A1 Jun. 25, 2015

Related U.S. Application Data

(60) Provisional application No. 61/918,119, filed on Dec. 19, 2013.

(51) Int. Cl.
*G06Q 30/00* (2012.01)
*G07C 5/08* (2006.01)
*G07C 5/00* (2006.01)

(52) U.S. Cl.
CPC ........... *G06Q 30/018* (2013.01); *G07C 5/008* (2013.01); *G07C 5/0808* (2013.01)

(58) Field of Classification Search
USPC .......................................... 705/317; 707/756
See application file for complete search history.

(56) References Cited

U.S. PATENT DOCUMENTS

| | | | | |
|---|---|---|---|---|
| 4,593,357 A | * | 6/1986 | Van Ostrand | G07C 5/10 340/439 |
| 5,068,656 A | * | 11/1991 | Sutherland | G08G 1/127 340/989 |
| 5,623,403 A | * | 4/1997 | Highbloom | G06Q 10/087 700/90 |

(Continued)

OTHER PUBLICATIONS

Brian Morrissey, Amazon Rolls Out Personalized Search Engine (Sep. 16, 2004), available at https://www.dmnews.com/channel-marketing/news/13077413/amazon-rolls-out-personalized-search-engine. (Year: 2004).*

(Continued)

*Primary Examiner* — Andrew B Whitaker
*Assistant Examiner* — Johnathan J Lindsey, III
(74) *Attorney, Agent, or Firm* — Michael P. Fortkort, Esq.; Michael P Fortkort PC; John A. Fortkort, Esq.

(57) ABSTRACT

A vehicle-centric cloud-based records management platform remains accessible through a web-based management portal and a mobile application, which can be integrated with vehicle devices for in-vehicle use. Regardless of the method of collection, the computerized method and system of the present invention are able to summarize the data into actionable documents for vehicle registration, fuel tax calculation/filing, and federal forms completion.

20 Claims, 14 Drawing Sheets

(56) References Cited

U.S. PATENT DOCUMENTS

| | | | | |
|---|---|---|---|---|
| 5,974,356 A * | 10/1999 | Doyle | G01C 21/28 | 342/357.3 |
| 6,526,341 B1 * | 2/2003 | Bird | G07C 5/008 | 340/573.1 |
| 6,622,083 B1 * | 9/2003 | Knockeart | G01C 21/362 | 701/420 |
| 7,881,838 B2 * | 2/2011 | Larschan | G06Q 10/06 | 701/29.2 |
| 8,413,039 B2 * | 4/2013 | Casey | G06F 17/243 | 340/3.2 |
| 9,208,623 B2 * | 12/2015 | Baumert | G07C 5/008 | |
| 2001/0010028 A1 * | 7/2001 | Thibault | G07C 5/04 | 701/29.6 |
| 2002/0059075 A1 * | 5/2002 | Schick | B61L 27/0094 | 701/31.4 |
| 2004/0243285 A1 * | 12/2004 | Gounder | G07C 5/0858 | 701/1 |
| 2005/0228688 A1 * | 10/2005 | Visser | G06Q 10/10 | 340/691.3 |
| 2006/0155439 A1 * | 7/2006 | Slawinski | G07C 5/0858 | 701/33.4 |
| 2007/0038347 A1 * | 2/2007 | Larschan | G06Q 10/06 | 701/33.4 |
| 2007/0156311 A1 * | 7/2007 | Elcock | G07C 5/008 | 701/31.4 |
| 2008/0188217 A1 * | 8/2008 | Harter | G06Q 10/00 | 455/426.1 |
| 2008/0294690 A1 * | 11/2008 | McClellan | G08G 1/096725 | |
| 2009/0292418 A1 * | 11/2009 | Kuykendal | G07C 5/085 | 701/33.4 |
| 2011/0238543 A1 * | 9/2011 | Paez | G06Q 10/1091 | 705/32 |
| 2012/0010774 A1 * | 1/2012 | McQuade | G08G 1/20 | 701/29.6 |
| 2012/0166346 A1 * | 6/2012 | Machlab | G06Q 30/018 | 705/317 |
| 2012/0323622 A1 * | 12/2012 | Scott | G06Q 10/063114 | 705/7.14 |
| 2013/0204485 A1 * | 8/2013 | Chen | G06F 17/00 | 701/29.6 |
| 2013/0282658 A1 * | 10/2013 | Besen | G06F 17/30215 | 707/634 |
| 2014/0266652 A1 * | 9/2014 | Morgan | B60R 25/00 | 340/426.11 |
| 2014/0279707 A1 * | 9/2014 | Joshua | G06Q 30/0283 | 705/400 |
| 2015/0170521 A1 * | 6/2015 | McQuade | G06Q 50/30 | 701/29.6 |

OTHER PUBLICATIONS

14456518 EIC 3600 Search Report—Jul. 2, 2020 (Year: 2020).*

* cited by examiner

METHOD AND APPARATUS FOR PREPARING, STORING AND RECORDING COMPLIANT RECORDS FOR MOTOR CARRIERS, REGISTRANTS, AND GOVERNMENTAL ORGANIZATIONS

RELATED APPLICATIONS

This application claims priority to U.S. Provisional Patent Application No. 61/918,119 filed Dec. 19, 2013 bearing the same title, which provisional application is hereby incorporated by reference in its entirety, including the drawings.

BACKGROUND

The present invention relates generally to computerized methods and systems for creating, maintaining and processing of records, and more particular to a method and system for creating, maintaining and processing of records related to motor carriers.

The genesis of the present invention lies in an identified alignment of needs across government, motor carrier, registrants, licensees and process agent stakeholders of the motor carrier industry. State and federal authorities are required to regulate motor carriers under existing laws, but there remains a significant gap between the regulations and effective enforcement regarding motor carrier record keeping, safety and compliance. Significant inefficiencies and confusion abound with respect to the keeping, publishing and communication of motor carrier records. The use of process agents is widespread throughout the motor carrier industry, but there are no effective and efficient communications channels between such agent and their customers, among the drivers and motor carriers or registrants, nor between the registrants and the various jurisdictions in this multi-billion dollar industry.

A complicating factor in regulation and fee/tax collection and equitable distribution is that a various of driver, vehicle, cargo, and business profiles affect record keeping requirements, including both the required content and the applicable uses of the records.

Most records-related applications/frameworks on the market are aimed at hours of service and distance recording, and the efficiencies such metrics can introduce into the day-to-day management of vehicles in fleets. For example, a recent Notice of Proposed Rulemaking (NPRM) [DEPARTMENT OF TRANSPORTATION, Federal Motor Carrier Safety Administration Notice of Proposed Rulemaking (NPRM) "Electronic On-Board Recorders and Hours of Service Supporting Documents" (Federal Register Volume 79 Number 60, Mar. 28, 2014) (49 CFR Parts 385, 386, 390, et al.)] eschews integrated hours of service, distance including in jurisdictional distance, fuel, and cargo reporting to accomplish merely drivers' hours of service recording. At an estimated total cost to implement between $1,578 M and $2,468 M for 4.36 M regulated vehicles, this NPRM addresses but one of several essential record keeping requirements and does not address data aggregation and analysis. In short, the U.S. Federal Government is issuing preliminary guidance that does not serve all stakeholders effectively and does not endeavor to provide a data basis for adequate roadway facility or regulation improvement.

Today, record keeping in the motor carrier industry is poor at best; the small percentage of audits undertaken reveal glaring inconsistencies and inadequacies in the way motor carriers maintain their obligatory records. Since only a fraction of fleets are audited per year (around a minimum of 3%, as mandated by inter jurisdictional agreements that guide vehicle registration fee apportionment and fuel tax collection and distribution), there is very little incentive for motor carriers to keep accurate records. As it stands, one can derive statistically that 80% of the audited accounts have errors (as demonstrated by statistics published by fifty-nine U.S. States and Canadian Provinces) and it is estimated that half of those registrant records are completely inadequate (non-compliant to the inter jurisdictional agreements). The errors and noncompliance are the results from two factors, primarily: Registrants and licensees have inadequate internal controls, causing unreliable source records (per trip, per vehicle, per driver, per cargo); and, inaccurate summaries, which are mandated features of the inter-jurisdictional agreements, causing inaccurate base jurisdiction and national reporting, registration fee calculations and apportionment, and inequitable distribution of fuel taxes. In short, record keeping is essential to the equitable funds transfers among the U.S. States and Canadian Provinces.

In addition to the management of billions of registration fees and tax distributions, the poor record keeping, inadequate internal controls, and inaccurate summaries also have important highway safety ramifications. Important programs, led by the United States Government's Department of Transportation (USDOT), by its Federal Motor Carrier Safety Administration (FMCSA), rely on reporting accuracy in order to allocate scarce inspection resources. Improved accuracy and timeliness in record keeping, therefore, would imply an increase in highway safety.

There are existing systems exist that provide automated collection of relevant trip details, addressing some aspects of the required records. These systems center around vehicle performance, driver hours of service or calculating fuel taxes.

For example, U.S. Pat. No. 7,881,838 B2 discloses a driver activity and vehicle operation logging and reporting system. This method for logging and reporting driver activity and vehicle operation includes identifying a driver of a vehicle, recording operating data with an on-board recorder that is hard-wired to an engine control module, coupled to a mileage sensing system, and linked to a global navigation satellite system, and recording duty status of the driver. A log of hours of service and a fuel tax log are created from the operating data. The method includes comparing the driver's hours of service log to an applicable requirement, indicating to the driver whether the driver is in-compliance or out-of-compliance with the applicable requirement, automatically uploading the logs to a receiver external to the vehicle using a wireless telecommunications network, and emitting a compliance signal representative of whether the driver is in-compliance or out-of-compliance with the applicable requirement to a second receiver external to the vehicle and under control of authorities.

U.S. Pat. No. 4,593,357 discloses a portable computer based motor vehicle performance monitoring system, which performs vehicle characteristic measurements and calculations.

U.S. Pat. No. 6,622,083 B1 discloses a system and method for making use of a removable device, such as a Personal Digital Assistant (PDA), cellphone or similar device, in conjunction with a driver information system. The removable device is brought to a vehicle and data in the removable device is transferred to the vehicle. This data can be data that is normally stored in the removable device, such as contact data, or it can be data that the operator has selected and loaded into the removable device for transport to the vehicle, for instance to update the vehicle information system. Data can also be transferred from the vehicle to external systems by transporting it in the removable device.

U.S. Pat. No. 6,421,590 B2 discloses a system and method for automatically calculating safety-related compliance data for vehicle operators. Vehicle operators enter a identification code and status information into a mobile communication terminal located on a vehicle. The identification code and status information is generally stored in a memory located within the mobile communication device. The identification code and status information can be transmitted to a central station where it can be processed to determine compliance with safety regulations. The resulting data may be transmitted back to the vehicle upon request. In another embodiment, a processor located within the mobile communication terminal processes the identification code and status information. The resultant data may then be transmitted to the central station or presented to the vehicle operator upon request.

U.S. Pat. No. 6,526,341 B1 discloses a method and apparatus for automatically creating and maintaining driver activity logs for vehicle operators. The vehicle operator is in communication with a central station using a mobile communication terminal located onboard an assigned vehicle. A vehicle operator driving status is determined at the central station when messages and position reports are transmitted from the vehicle to the central station. A driver activity log is created upon request by the vehicle operator or by authorized personnel at the central station or host facility. The driver activity log may then be transmitted to the vehicle for display.

U.S. Patent Publication No. 20100039254 A1 discloses a machine-controlled method that can include a mobile electronic device capturing transportation activity information corresponding to a particular transportation activity for a user, evaluating the transportation activity information based on a set of compliance rules, and issuing an alert to the user in response to determining that the transportation activity information is not in conformance with the set of compliance rules.

EP 2136377 B1 discloses a system and method for collecting data in a vehicle.

U.S. Patent Publication No. 20010018628 A1 discloses a system for monitoring vehicle efficiency and vehicle and driver performance. In this disclosure, a commercial vehicle fleet management system integrates a vehicle on-board computer, a precise positioning system, and communication system to provide automated calculating and reporting of jurisdictional fuel taxes, road use taxes, vehicle registration fees, and the like. Also disclosed is an online mobile communication system and a system for monitoring carrier vehicle efficiency and vehicle and driver performance.

U.S. Pat. No. 6,714,857 B2 discloses a system for remote monitoring of a vehicle and method of determining vehicle mileage, jurisdiction crossing and fuel consumption. A monitoring system determines vehicle position and fuel consumption in a jurisdiction, and jurisdiction crossings. The system includes a vehicle having a fuel reservoir from which fuel is consumed as an energy source. The system also includes a positioning system for generating the present position information of the vehicle. The information includes latitude and longitude data points. Additionally, the system includes a fuel monitoring device in the fuel reservoir, whereby the fuel monitoring means generates information including the present level of fuel in the fuel reservoir. Also, a data collection device collects the present position information and the present level of fuel information. Finally, the system includes a processor located at a remote site from the vehicle, which processor receives data from the collecting device. The processor determines when the vehicle crosses a jurisdiction border and computes the fuel consumption in the jurisdiction, the fuel consumption data can then be later used to compute the fuel tax.

Despite the aforementioned efforts, there remains a long felt need for a records management system that aggregates trip data into usable summaries and formats for registration, licensing, United States Federal Motor Carrier Administration (FMCSA) mandated Motor Carrier Management Information System (MCMIS) filings, Unified Registration System reporting requirements, payment by registrants and enforcement of proof of payment of United States Internal Revenue Service (IRS) Federal Heavy Vehicle Use Tax returns by U.S. and Mexican States, the District of Columbia, and Canadian Provides (as required by 26 CFR 41.6001-2, PROOF OF PAYMENT FOR STATE REGISTRATION PURPOSES), and fuel tax filings that guide the reconciliation, payment, and redistribution of fuel taxes and other vehicle-related fees among the participating North American jurisdictions and governments.

The present invention is therefore directed to the problem of developing a computerized method and apparatus for recording, tracking and communicating motor carrier records between and among process agents, their customers, and government regulators, whilst also increasing the ability for process agents to communicate with their clients, find and contact new clients and manage larger pools of registrants still requiring their assistance. The invention also provides a method of vehicle fleet analysis to allow process agents and their customers, as well as other fleet registrants and motor carriers to optimize their fleet operations insofar as fleet registration and tax returns.

SUMMARY OF THE INVENTION

The present invention solves these and other problems by providing a vehicle-centric cloud-based records management platform that is accessible through a web-based management portal and a mobile application, which can be integrated with vehicle devices for in-vehicle use. Regardless of the method of collection, the computerized method and system of the present invention are able to summarize the data into actionable documents for vehicle registration, fuel tax calculation/filing, and federal forms completion.

The present invention, which we label the mRecords™ platform, enables the creation, storage and recording of compliant records, accompanied by the ability to dynamically transform these records into formats required by state and federal governments. This transformation of records is integral to the overall proposition, and to increasing efficiency within the overall records keeping and compliancy system.

The present invention aims to impact the stakeholders below in the following ways:

Government

The present invention will provide the opportunity to gain the following efficiencies at both National United States and Canadian governments, as well as fifty-nine State and Provincial governments:

Integration of manual supplement and other transactional activities significantly increases accuracy and efficiency of processes while helping the registrants, motor carriers, drivers, and shippers greater assurance of compliance, continuously, rather than the current rare and discrete opportunities to assess compliance Reliable and automated linkage of source documents and required summaries allow for faster fleet audits with greater accuracy, leading to continuous auditing and increased jurisdiction productivity, while reducing errors Significant decrease in manual processes for government employees to conduct the required renewal transactions and audits Assess reported fleet mileage between programs, such as the International Registration Plan (IRP) and the International Fuel Tax Agreement (IFTA), which are both programs handling billions of dollars annually and used by nearly all North American jurisdictions and over two million companies, and acknowledged by the United States Government and the Government of Canada, to ensure consistency and check for incorrect reporting, resulting in more equitable calculation and distribution of registration fees and fuel taxes Decreased manual and human workload allows the potential for a significant increase in audits, allowing for significant increase in overall accuracy and safety as well as a significant increase in the richness and accuracy of the overall data set, resulting in greater confidence in the financial and safety programs at the State/Province and National levels.

Motor Carriers

The present invention will also enable the following efficiencies for motor carriers:

With less manual paperwork, source records and summaries are continuously organized to ensure continuous compliancy. If the motor carrier maintains their records within the platform of the present invention, the system can check all records for relevant errors and inconsistencies far more efficiently and effectively than the current manual methods.

Records can be passively collected via the mobile application to ensure all information is collected for compliancy, reducing driver workload The publishing module enables the compilation of all relevant paperwork much more quickly than via a manual method to ensure all information for audit or renewal is available quickly and accurately.

The error checking facility ensures compliancy when submitting records for audit or renewal, avoiding any associated penalties.

The present invention provides logistics possibilities around fleet management for IRP and IFTA fleets to maximize profit and minimize costs.

The knowledge of the operations of the motor carrier fleets, acquired by the automated collection and analysis of the source records, enables automated creation of data summaries that are required for submission to both base North American jurisdictions (States and Canadian Provinces) as well as information that is required for mandated filings to the United States Government, such as per 49 CFR Parts 360, 365, 366, et al (Unified Registration System; Final Rule).

The present invention enables the integration of transactions and supplements into the platform that usually require manual, on-site processing significantly reduces lag time, incomplete analysis or summarization, or unintentional noncompliance.

Drivers

When using the mobile onboard recording application of the present invention, drivers are enabled to be relieved of active records taking, with only minimal interaction required to take comprehensive and compliant records for every minute they are in the cab of a vehicle.

Because records are transformed contemporaneous to the events leading to the need for the record(s), automated analysis and workflow can identify issues or omissions in the records to assist in correction and update to ensure compliancy.

Process Agents

The present invention reduces motor carrier reliance upon process agents, or conversely provides a tool for process agents to deliver its services more comprehensively and less expensively than currently possible.

The knowledge of the operations of the motor carrier fleets, acquired by the automated collection and analysis of the source records, enables automated definition of data required for submission to both base North American jurisdictions but also data required to submit regularly required filings to the United States Government. Using the present invention, Process Agents may evolve strategies for their customers with regard to fleet composition, terminal placement, vehicle or driver optimization, and even demonstrate fleet vehicle compositions to minimize costs and optimize profits.

The present invention makes the services that are currently offered by process agents much less valuable to motor carriers, as the service provided by the platform of the present invention enables much more self-sufficient motor carriers, but spawns new economic value potentialities. Despite the reduced need for process agents, the platform of the present invention allows process agents to target a much wider market, meaning the services they can offer can still be provided to a profitable segment of the industry.

Features of the mRecords Platform

1. Records Transformation

One advantageous aspect of the present invention includes the mRecords platform for both motor carriers and government authorities, which comprises a Records Summarization and Transformation Module. This Records Summarization and Transformation Module, facilitated by other aspects of the mRecords platform, represents a departure from traditional records management platforms. The Records Summarization and Transformation Module increases registrants' confidence that their records are complete and compliant. In addition, the platform affords a centralized, always accessible repository, partnered with an integrated compilation and summarization method for the records, in combination with multiple options for records submission during audit, or renewal requests. Additionally, the Records Summarization and Transformation Module also enables a significant increase in efficiency on the State and Province government level, as the records compiled and summarized by the mRecords platform can be provided to motor carrier regulatory bodies in a variety of formats. This includes automatic ingestion and processing of these records if the base jurisdiction uses the mCarrier motor carrier registration, licensing, and permitting computer application. Additionally, additional automatic ingestion/consumption capabilities are provided. These compiled and summarized records sets also reduce the significant burden of man-hours relating to manual data entry, interpretation of poor records sets and compliancy guidance, as the records are checked and verified within the mRecords platform prior to delivery.

2. Knowledge Portal

The Knowledge Portal comprises a unique proposition for the motor carrier industry. It provides a single point of information access for all stakeholders within the industry, and remembers visitors' visits to the site, enabling a much more focused and tailored experience on subsequent visits. The Knowledge Portal aims to assemble a complete resource for information on all regulatory and business requirements for those operating within the industry, regardless of their role, or registration with the mRecords platform.

The Knowledge Portal provides a single point of information access for all stakeholders within the industry, and remembers visitors' visits to the site, enabling a much more focused and tailored experience on subsequent visits.

3. Relational User Framework

The Relational User Framework contained within the mRecords platform, provides all users of the system with the ability to contact other users (where appropriate based upon role within the industry) and to manage connections within their businesses. Additionally, as the Relational User Framework has access to government safety statuses on motor carriers, drivers and registrants, the framework can provide potential business associates with assurances that new or potential employees/employers are permitted to operate in their appropriate field (based upon government held safety records etc.).

4. External Connection Manager

The External Connection Manager allows for both the integration of external data sources to produce records in conjunction with the core mRecords platform records generation service and integration and consumption of government data through integration with government databases. The configurability of the External Connection Manager allows for increasing integration with other external data sources should they be requested as well as a possibility of licensed APIs (application programming interface) for record creation by external companies.

5. Record Keeping

According to one aspect of the present invention, an exemplary embodiment of a method of record keeping artifact ingestion and storage enables transformation of data into actionable information for automated generation of supplemental transactions for vehicle registrations. According to this exemplary embodiment, the records are maintained to enable registrants or their systems to generate information in compliant content and context for accurate supplemental transactions, including original applications, renewals, and change supplements. Supplements generated by registrants or their systems are conducted with fewer manual operations and less manual effort than current paper-based and electronic credentialing systems in existence. The records are maintained to enable formulation of all or a significant subset of information in format that enables a base, registration, or certifying jurisdiction to act on the registrant-generated registration requests and fuel tax return, for examples, with fewer manual data entry operations, less manual calculation or transcription of the calculations, and fewer errors than current paper-based and electronic credentialing systems in existence.

6. System Architecture

According to another aspect of the present invention, the design of the platform affords flexibility within methods of records ingestion, using structured and/or unstructured information methods, to extract, store, and manage data inherent in transportation operations including fleet, vehicle, cargo, fuel, driver, safety, roadway, time, or other operational characteristics of operations, so that the records are usable for fleet registration, tax, planning, and operational actions and transactions. The platform enables extraction of specific data elements from web-based systems, integration with the requirements of established business processes to create a records extract or complete auditable record, which may then be verified using external information, enabling the person or system providing the data to complete or correct individual or multiple records. The platform enables extraction of specific data elements from on-board (in-vehicle) recording devices, integration with the requirements of established business processes to create a complete or partial auditable record that may be verified using external information and systems, enabling the person or system providing the data to complete or correct individual, or multiple records. The platform enables extraction of specific data elements from written records, integration with the requirements of established business processes to create a complete or partial auditable record that may be verified using external information, enabling the person or system providing the data to complete or correct the record. The platform provide organization of the records by fleet, driver, shipper, or other attribute to enable aggregated, anonymous, summarized, reported or transmitted, to enable creation of original, cross-fleet, renewal, or change supplement with linkage to the auditable detailed vehicle movement, cargo, fuel, or driver records.

Substantiating records for supplements, such as historical movement records associated with fleets, or vehicles, are related to the supplemental transactions, so that manual or automated reports or other methods of research will enable formulation, optimization, or verification of the supplemental requests. Usage of records per fleet, driver, shipper, or other attribute to aggregate, summarize, report, or transmit audit data to substantiate original, cross-fleet, renewal, or change supplement/s based on the auditable detailed vehicle movement, cargo, fuel, or driver records. Usage of aggregated, summarized, reported or transmitted records for fleet, driver, shipper, or other attribute for automated analysis of original, cross-fleet, renewal, or change supplement based on the auditable detailed vehicle movement, cargo, fuel, or driver records in order to analyze, assess, validate, or recomputed historical supplements. Usage of aggregated, summarized, reported or transmitted records for fleet, driver, shipper, or other attribute for automated analysis of original, cross-fleet, renewal, or change supplement based on the auditable detailed vehicle movement, cargo, fuel, or driver records in order to analyze, assess, validate, or recomputed historical records as required by governmental, motor carrier, or registrant requirements.

The present invention manages records to enact generalized and specific views of registration, tax, planning, and operational transactions relevant to a stakeholder in the fleet, or vehicle in a knowledge portal that provides partial or complete resources for information on some or all regulatory and business requirements for those operating within the industry, regardless of their role, or registration with the mRecords platform. Registrants are able to maintain, validate, organize, summarize, and apply vehicle movement records within and across fleets. Motor carriers are able to view historical, current, or planned records of vehicle movement for operational and fleet optimization. Drivers are able to maintain service records to comply with national, federal, other jurisdictional, or contractual or procedural requirements of motor carriers, registrants, or shippers as well as maintain logs in association with vehicle movement records in order to meet record keeping requirements. Shippers are able to use historical or planning-assignment information to optimize fleet and inter-fleet cargo movements. Governmental and educational institutions are able to use the detailed or summarized records for highway facility analysis and planning. The Relational User Framework provides some or all users of the system the ability to contact other users in context to the user's role within the industry and connections within their businesses. The Relational User Framework accesses government safety statuses on motor carriers, drivers and registrants; and the framework can provide potential business associates with assurances that new or potential employees/employers are permitted to operate in their appropriate field (based upon government held safety records etc.).

The External Connection Manager enables the integration of external data sources to produce records in conjunction with the core mRecords platform records generation service and integration and consumption of government data through integration with government databases. The configurability of the External Connection Manager allows for evolutionary integration with other external data sources as governmental requirements and systems emerge. Applying the structured data in the mRecords database, enable aggregated, summarized, reported or transmitted records for fleet, driver, shipper, or other attribute as required. Applying the External Connection Manager enables development and licensing of Application Programming Interfaces (APIs, to include real time, batch, and heterogeneous methods) for records request by the external agency and records release by the motor carriers, drivers or registrants.

According to one aspect of the present invention, an exemplary embodiment of method of record keeping artifact ingestion and storage enables transformation of data into actionable information for automated generation of supplemental transactions for vehicle registrations:

- Records kept enable registrants or their systems, or on systems operated on their behalf, to generate information in compliant content and context for accurate supplemental transactions, including original applications, renewals, and change supplements.
- Supplements generated by registrants or their systems are conducted with fewer manual operations and less manual effort than current paper-based and electronic credentialing systems in existence.
- Records kept enable formulation of all or a significant subset of information in format that enables a base, registration, or certifying jurisdiction to act on the registrant-generated request with fewer manual operations and less manual effort than current paper-based and electronic credentialing systems in existence.
- Record keeping artifact ingestion is managed by both the Connection Manager (via an Enterprise Service Bus, or ESB) and via users accessing the Web-based portal. The Connection Manager allows a variety of services.

According to another aspect of the present invention, the system design affords flexibility within methods of records ingestion, using structured and/or unstructured information methods, to extract, store, and manage data inherent in transportation operations including fleet, vehicle, cargo, fuel, driver, safety, roadway, time, or other operational characteristics of operations, so that the records are usable for fleet registration, tax, planning, and operational actions and transactions.

- Extraction of specific data elements from web-based systems, integration with the requirements of established business processes to create a records extract or complete auditable record, which may then be verified using external information, enabling the person or system providing the data to complete or correct individual or multiple records.
- Extraction of specific data elements from on-board (in-vehicle) recording devices, integration with the requirements of established business processes to create a complete or partial auditable record that may be verified using external information, enabling the person or system providing the data to complete or correct individual, or multiple records with source data correlations.
- Extraction of specific data elements from written records, integration with the requirements of established business processes to create a complete or partial auditable record that may be verified using external information, enabling the person or system providing the data to complete or correct the record.
- Organization of the records by fleet, driver, shipper, or other attribute to enable aggregated, anonymized, summarized, reported or transmitted, to enable creation of original, cross-fleet, renewal, or change supplement with linkage to the auditable detailed vehicle movement, cargo, fuel, or driver records.

Applications and Advantages of Various Embodiments Herein

1) Record keeping data extraction is managed by both the Connection Manager and the Enterprise Service Bus (ESB).
2) Integration with internal business processes is managed by the Record Framework.
3) Organization of records is managed by the Records Framework in conjunction with user information managed by the Relational User Framework.
4) Any further Transformation of the records is managed by the Records Summarization/Transformation module According to another aspect of the present invention, the system of the present invention enables substantiating that records for supplements, such as historical movement records associated with fleets or vehicles, are related to the supplemental transactions, so that manual or automated reports or other methods of research will enable formulation, optimization, or verification of the supplement filings.

- Usage of records per fleet, driver, shipper, or other attribute to aggregate, summarize, report, or transmit audit data to substantiate original, cross-fleet, renewal, or change supplement/s based on the auditable detailed vehicle movement, cargo, fuel, or driver records.
- Usage of aggregated, summarized, reported or transmitted records for fleet, driver, shipper, or other attribute for automated analysis of original, cross-fleet, renewal, or change supplement based on the auditable detailed vehicle movement, cargo, fuel, or driver records in order to analyze, assess, validate, or recomputed historical supplements.
- Usage of aggregated, summarized, reported or transmitted records for fleet, driver, shipper, or other attribute for automated analysis of original, cross-fleet, renewal, or change supplement based on the auditable detailed vehicle movement, cargo, fuel, or driver records in order to analyze, assess, validate, or recomputed historical records as required by governmental, motor carrier, or registrant requirements.

According to another aspect of the present invention, the system of the present invention manages records to enact generalized and specific views of registration, tax, planning, and operational transactions relevant to a stakeholder in the fleet, or vehicle in a knowledge portal that provides partial or complete resources for information on some or all regulatory and business requirements for those operating within the industry, regardless of their role, or registration with the mRecords platform.

Registrants are able to maintain, validate, organize, summarize, and apply vehicle movement records within and across fleets.

Motor carriers are able to view historical, current, or planned records of vehicle movement for operational and fleet optimization.

Drivers are able to maintain service records to comply with national, federal, other jurisdictional, or contractual or procedural requirements of motor carriers, registrants, or shippers as well as maintain logs in association with vehicle movement records in order to meet record keeping requirements.

Shippers are able to use historical or planning-assignment information to optimize fleet and inter-fleet cargo movements.

Governmental and educational institutions are able to use the detailed or summarized records for standards assessment, policy, and planning for highway usage and related facility changes.

1) The Record Framework enables comprehensive records to be recorded, stored and maintained against specific vehicles and users 2) The Relational User Framework enables the data stored within the Record Framework to be accessible where needed for association with records stored against user profiles within the system.

According to another aspect of the present invention, the Relational User Framework provides some or all users of the system the ability to contact other users in context to the user's role within the industry and connections within their businesses.

The Relational User Framework may access government safety statuses on motor carriers, drivers and registrants, the framework can provide potential business associates with assurances that new or potential employees/employers are permitted to operate in their appropriate field (based upon government held safety records, etc.).

1) Access to government safety statuses on motor carrier, drivers and registrants is managed via the Connection Manager (ESB) and the relevant information then filtered by the Relational User Framework.

2) Abstraction of the data collected by the Connection Manager enables combinations of multiple datasets from externals sources to be combined into mRecords data structure.

According to another aspect of the present invention, the External Connection Manager enables the integration of external data sources to produce records in conjunction with the core mRecords platform records generation service and integration and consumption of government data through integration with government databases.

The configurability of the External Connection Manager allows for evolutionary integration with other external data sources as governmental requirements and systems emerge.

Applying the structured data in the mRecords database, enable aggregated, summarized, reported or transmitted records for fleet, driver, shipper, or other attribute as required.

Applying the External Connection Manager enables development and licensing of Application Programming Interfaces (APIs, to include real time, batch, and heterogeneous methods) for records request by the external agency and records release by the motor carriers, drivers or registrants.

1) New external connections can be introduced via configuration of the Connection Manager.

2) Abstraction of the data collected by the Connection manager enables combinations of multiple datasets from externals sources to be combined into mRecords data structure.

These and other aspects of the present invention will be apparent upon review of the drawings in light of the subsequent description.

DETAILED DESCRIPTION

The present invention provides a vehicle-centric, cloud-based records management platform that is accessible through a web-based management portal as well as via a mobile application suitable for in-vehicle use. The records management platform (termed mRecords™) comprises one or more servers (or computers) coupled to one or more databases or memory devices. The servers employ non-transitory computer readable media to store instructions that cause processors within the server working with memory to execute various methods and processes set forth herein.

The mobile application comprises non-transitory computer readable media that is operable on a portable computing device, such as a smart phone, laptop, IPhone®, IPad™, computing tablet or the like.

A computer has loaded on it record tools that open a portal between the computer and the mRecords™ platform of the present invention, enabling a user to access the mRecords™ platform. The records tools comprise non-transitory computer readable media that cause the processor within the computer to open the portal.

Figure 1:
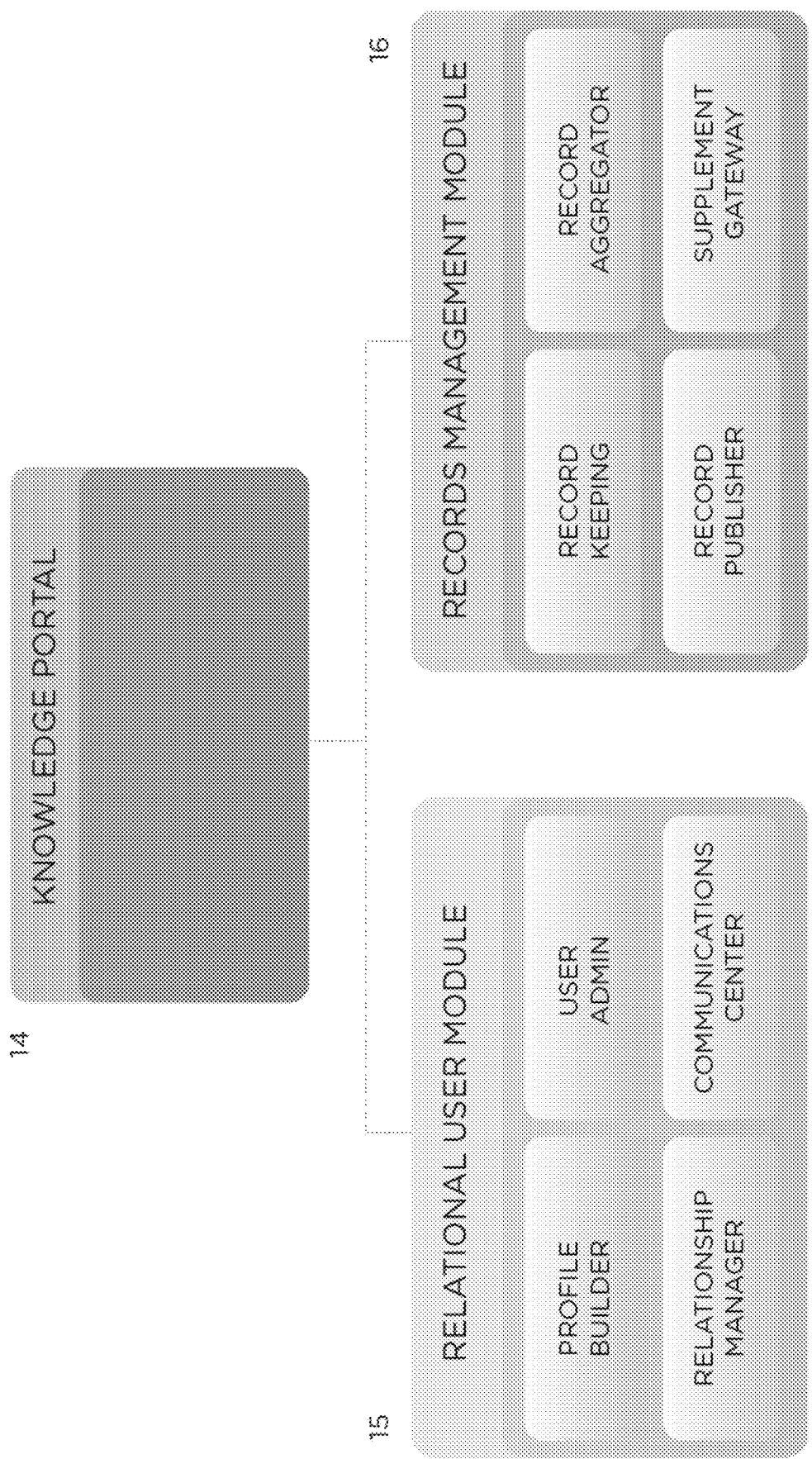
FIG. 1 depicts an exemplary embodiment of a vehicle-centric, cloud-based records management platform that is accessible through a web-based management portal as well as a mobile application suitable for in-vehicle use according to one aspect of the present invention.

Turning to FIG. 1, the platform of the present invention comprises at least three main components—a Knowledge Portal 14, a Relational User Module 15, and a Records Management Module 16. Each of these modules 14-16 comprises a number of distinct sub-modules, thereby providing a seamless user experience for all stakeholders within the motor carrier industry. These modules and sub-modules can be identified in the manner shown in FIG. 1. Each of these modules and sub-modules comprises non-transitory computer readable media that can be executed on one or more traditional servers in a client-server model, for example.

Knowledge Portal

The Knowledge Portal 14 is a unique component of the mRecords™ platform of the present invention, providing a one-stop resource for all stakeholders in the motor carrier industry (whether from a commercial or public standpoint) to access information most relevant to them. Rather than having to search for information integral to compliance, record keeping, day-to-day business operations or safety and maintenance of vehicles, the Knowledge Portal 14 guides users based upon their specific needs, which are established through a focused 'wizard' interface, to the information they need. Additionally, the Knowledge Portal 14 also provides information on how to use the present invention, connect to other users of the platform and optimize their usage of the present invention to achieve full records compliancy.

Relational User Module

The Relational User Module 15 is a key component of the system of the present invention. In contrast to user management associated with most records management systems, the Relational User Module 15 has minimal reliance on users updating and maintaining their personal information. Through integration with National Inter jurisdictional and Local and Provincial Government systems (see FIG. 4), the Relational User Module 15 is able to establish the majority of pertinent information dynamically by downloading the pertinent information from the various government databases. As a result, the Relational User Module 15 reduces the number of data entry errors, reduces user/profile duplication and provides a far more cohesive integration with government system and compliancy than standard systems.

The Relational User Module 15 includes a profile builder, a user administrator, a relationship manager and a communications center.

Additionally, the onerous traditional user management system is avoided in the Relational User Module 15, as each user's relevance to the system is gauged on their relationship to registered vehicles—each role, from registrant, motor carrier, driver and process agent is defined in a vehicle centric relationship.

Because each user is identified in a set role (or number of roles) as delineated by the motor carrier industry and Inter jurisdictional and Local and Provincial Government systems, every user is grouped accordingly, given relevant permissions within the system and can interact with other users dependent upon these roles and permissions.

Additionally, the Relational User Module 15 incorporates a centralized communication center that allows communication between connected users, administrators of the system and governmental regulatory bodies to be collected, viewed, created and responded to under the one user account.

Profile Builder

The profile builder is a module of the Relational User Module 15 that integrates with National Inter-jurisdictional and Local and Provincial Government systems to build a profile for each user based upon those records held on file. Users only need enter a few simple details (Name, Vehicle Identification Number (VIN) of associated vehicle or U.S. Department of Transportation (USDOT) number). Because the system is vehicle-centric rather than user-centric, the user's role and relationship to the system will always be dictated by their relationship to vehicles registered with government authorities.

User Administration

In contrast to the majority of other records management systems, the User Administrator of the Relational User Module 15 can be made relatively simple. As most of the information kept by the system is gathered from official records, only minor amendments need to be made, including personal contact details etc. All changes to a user's association with a vehicle, or fleet will automatically be detected and flagged with the user, (through integration with government databases and services) allowing for minimal effort on behalf of the individual user.

Connection Manager (Relationship Manager)

By ensuring all stakeholders of a motor carrier business are signed-up to the mRecords™ platform each stakeholder can then be linked according to role and responsibility. Motor Carriers can invite new drivers to create trip records for one of their vehicles, and registrants can assign new Motor Carriers Responsible for Safety through their portal. Drivers can request introductions to both motor carriers and registrants, and permission to operate vehicles in a fleet with mobile integration can be granted or rescinded through the Connection Manager 562 (see FIG. 4).

The Connection Manager is an ESB (enterprise service bus), a software architecture designed to create agility and flexibility in terms of communication and interaction between applications. The ESB architecture allows for the management of multiple external services (such as trip recorders, distance and mileage recorders, hours of service recorders, etc.) through a central bus, whilst providing an abstraction layer over the underlying details being communicated. This enables the ESB to broker/translate differences that may exist across external services in terms of naming conventions, identity management, communication protocols and/or message formats. This enables all connected services to contribute data to a user's records set within the mRecords platform, independent of their codebase, communication protocols (e.g., HTTP, FTP, REST, SOAP, JSON, etc.) or naming conventions.

Additionally, the connection manager is also architected to allowed connection to multiple government databases, without being restricted by database type. In this sense, the ESB architecture acts as an API (Application Programming Interface), which unifies the communication between the mRecords™ platform and each database type (SQL Server, MySQL, Oracle, DB2, etc.) connected via the Connection Manager via the ESB architecture.

Once an external service or database has connected to the ESB, the information transferred is abstracted and making it consumable by the modules within the mRecords platform. All external services will be integrated with the aim of creating or contributing to a comprehensive vehicle records set, the backbone of the mRecords platform.

Communications Center

The Communications Center provides a central point of communication between individual users of the platform, as well as enabling updates and notifications from governmental regulatory groups/bodies. All communications are aggregated dependent upon the user, their connections and their role within the motor carrier industry.

Records Management Module

Record Keeping

The Record Keeping of the mRecords™ platform is a key component. The mRecords™ platform of the present invention offers the following approaches:

1) Entering records via uploading of a manually completed spreadsheet.
2) Entering the records through the online portal, following the completion of each individual trip. Multiple trips can be entered at any time.
3) Uploading source files from approved external record-keeping applications, such as that provided by J.J. Keller and other companies.
4) Using the mobile application of the present invention and onboard recording device to keep passively record mileage, and track driver hours of service.

Record Aggregator

The records aggregator is a service unique to the system of the present invention. The aggregator checks every single trip recorded, entered or registered within the mRecords™ platform (independent of recording method) and checks for compliance issues within each record and all records on an ongoing basis. The aggregator checks for continuous odometer readings (gaps indicate missing mileage), recorded mileage consistency (reported miles in relation to odometer readings and reported mileage versus approximate route distances) and that all other mandatory information is recorded in the required manner.

If inconsistencies are found within a record, or record set, the aggregator flags the error to the individual responsible for the record. Users are prevented from publishing their records via the Records Publisher unless all records are compliant.

Record Publisher

The Records Publisher works in conjunction with the Record Aggregator to form a transformational service for records unique to the system platform. The publisher allows the user (motor carrier or registrant) to publish records in submission formats required by National, Inter-jurisdictional Agreement, and State/Local and Provincial Government systems, with the option to either print out their submission to take to their relevant authority, or, if the authority allows, automatically compile and submit their records via the application.

The Records Publisher integrates automatically with existing systems that currently operate in four jurisdictions, but also provide submission formats suitable for all other jurisdictions with the International Registration Plan (IRP) and International Fuel Tax Agreement (IFTA) coverage zones.

Record Parser

The Record Parser is a module within the Records Management Module 16 that enables continuous and on-request parsing, auditing and error logging for all records logged by a user within the system. The Record Parser checks constantly for inconsistencies within records, including gaps in odometer readings, incorrect or inaccurate mileage recording and any and all factors that cause non-compliancy in a renewal or audit scenario. Users responsible for creating individual records (drivers) and those responsible for collected records (registrants) are both alerted to errors and/or consistencies within individual trip records and entire record sets, and provides suggestions/options for correcting identified issues, allowing the user to bring their individual, or sets of records back to a compliant state.

Supplement Gateway

The Supplement Gateway service allows motor carriers to integrate with State/Local and Provincial Government systems to provide transactional processes, such as the addition of additional jurisdictions under IRP or the addition of a new apportioned vehicle to an existing IRP fleet. This system integrates with states operating the Legatus® Solutions mCarrier™ system, and with integration tools made available for other states employing alternative systems. Similarly, for fuel tax licensing, the Supplement Gateway facilities original and renewal applications, and vehicle additions.

Figure 2:
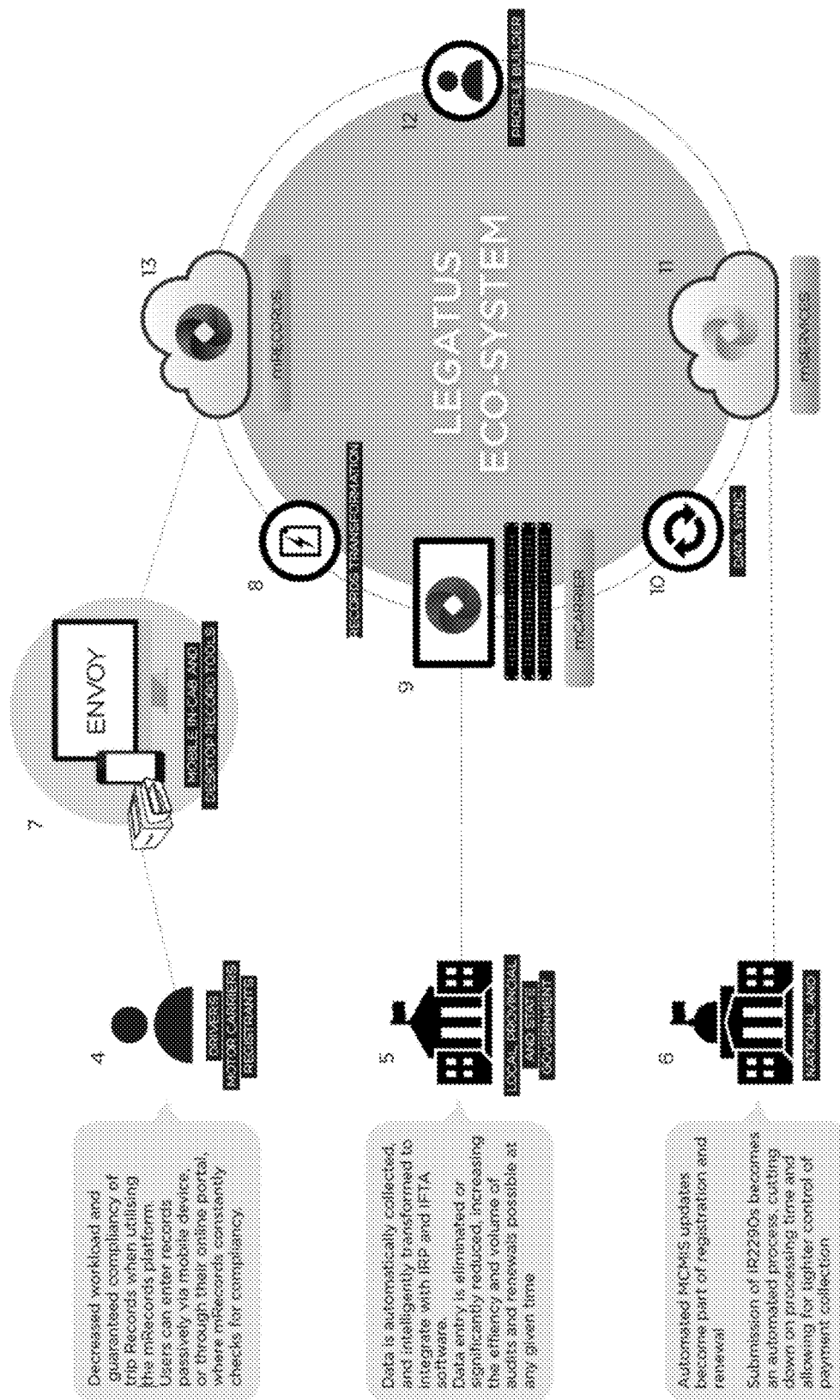
FIG. 2 depicts another exemplary embodiment of the present invention of a records management system interacting with existing systems and databases according to yet another aspect of the present invention.

Turning to FIG. 2, shown therein is one exemplary embodiment of the platform 13 of the present invention (termed mRecords™) interacting with existing systems and databases according to one aspect of the present invention.

mRecords™ and the Legatus® Infrastructure

The mRecords™ platform 13 integrates with other services within the Legatus® Ecosystem, and services that enable integration with National Inter jurisdictional and Local and Provincial Government systems. FIG. 2 illustrates the relationship with these systems and the overall process flow between them and the mRecords™ platform 13. Additionally, a brief description of these systems is included below.

In short, the mRecords™ platform 13 interfaces with the ENVOY system using a mobile application 7 of the present invention that interacts with the ENVOY in-cab unit, thereby enabling drivers, motor carriers and registrants 4 decreased workload and guaranteed compliance of trip Records when utilizing the mRecords™ platform 13. Users can enter records passively via the mobile device on which the mobile app 7 of the present invention operates, or through their online portal (accessible on a desktop computer), which the mRecords™ platform 13 constantly checks for compliance. The desktop computer includes non-transitory computer readable media of the present invention (desktop record tools) that causes the desktop computer to open a portal to the mRecords™ platform 13 over a network connection, such as the Internet or other public or private network. All data from the ENVOY device is thereby available to the mRecords™ platform 13.

The mRecords™ platform 13 also interacts with the mCarrier™ platform 9 (described below), which interfaces with local and provincial government systems 5 so that data is automatically collected, and intelligently transformed to integrate with IRP and IFTA software. Data entry is eliminated or significantly reduced, increasing the efficiency and volume of audits and renewals possible at any given time. The mRecords™ platform 13 interacts with the mCarrier™ platform 9 to transform the records (records transformation process 8) being submitted to the various local, state and provincial government systems 5, as well as accesses these systems 5 via the mCarrier™ platform 9 to obtain records for use in creating the system data to reduce data entry by users 4 enabling continuous accuracy of user information, and expedited profile construction based upon the vehicle-centric user model.

mCarrier™ Platform

The mCarrier™ platform 9 is a proprietary software platform owned and administered by Legatus® Solutions Corporation in four jurisdictions in a number of configurations. The mCarrier™ platform 9 is responsible for processing audits, renewals and other supplement transactions within each jurisdiction, as well as communicating all and any changes to the relevant National Inter jurisdictional government databases, and syncing with these government databases 5 to ensure that each jurisdiction remains in-line with all other jurisdictions.

mServices™ Database

The mServices™ database 11 is a duplicate data set of the CVIEW (Commercial Vehicle Information Exchange Window) database 6 used by the national government, which mServices™ database 11 both synchronizes with those jurisdictions coupled to the mCarrier™ platform 9 on a more regular basis than CVIEW (see data sync process 10), and also provides web-service access to the mRecords™ platform 13 via the profile builder 12, enabling continuous accuracy of user information, and expedited profile construction based upon the vehicle-centric user model. Thus, automated MCMIS updates from database 6 become part of registration and renewal; and submission of IR2290s becomes an automated process, cutting down on processing time and allowing for tighter control of payment collection.

ENVOY (mRecords) Mobile in-Cab Recording Tools (or Other Alternative Services)

Figure 3:
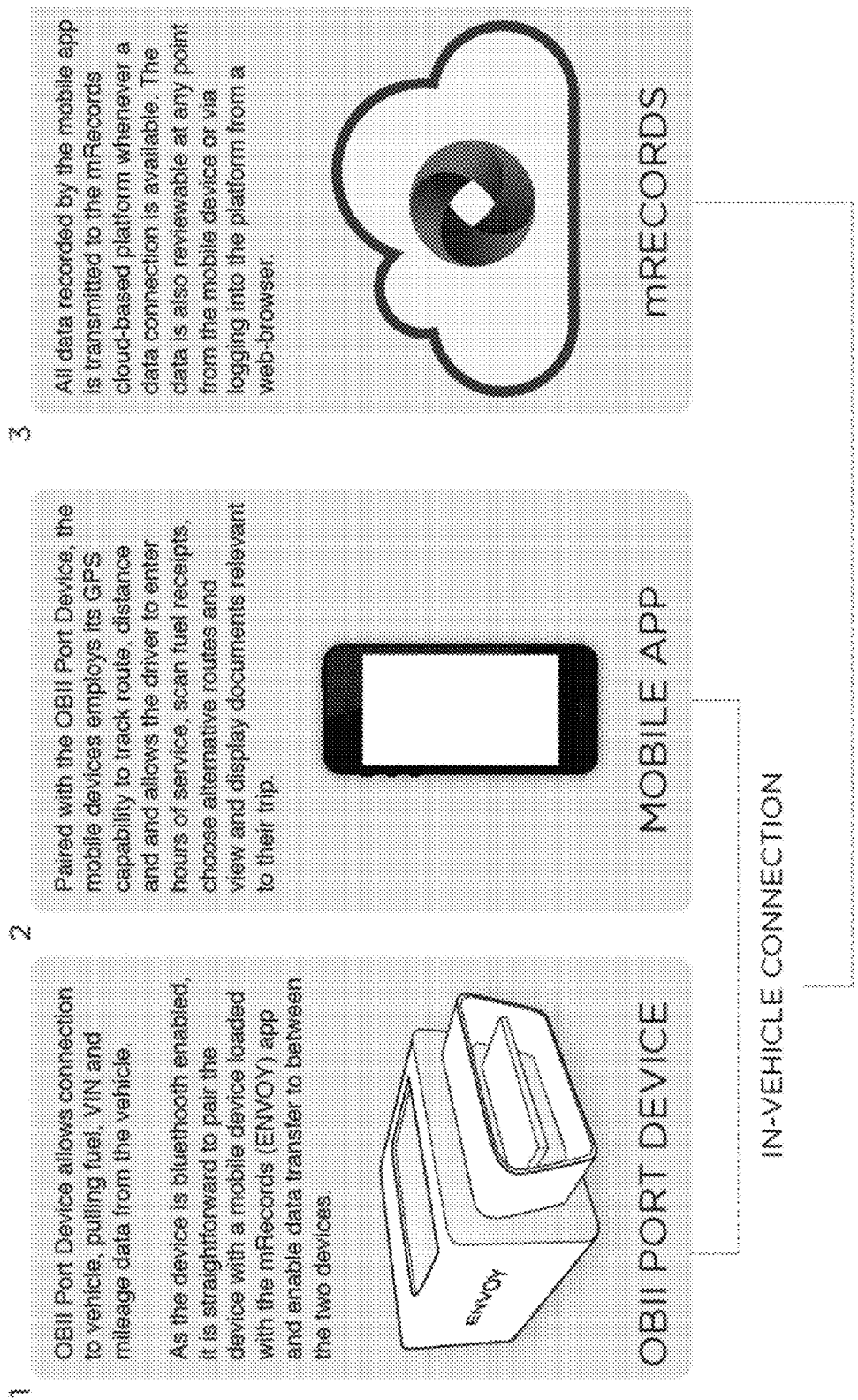
FIG. 3 depicts various components of an embodiment of the present invention of a records management system according to still another aspect of the present invention.

ENVOY is component of mRecords™ that is an onboard recording platform that integrates a Bluetooth™-enabled OBDII port reader device 1 and a mobile application 2 of the present invention (along with desktop recording tools (see FIG. 3). The mobile application 2 of the present invention operable on a handheld device (e.g., smart phone, cellphone, tablet, portable computing device, etc.) records driver hours of service, records relevant trip data (location, mileage, speed, fuel consumption etc.) and uploads this data to the mRecords™ platform 13 using a network connection or an interface to a desktop or other computer on which the record tools of the present invention are loaded. Drivers are connected to the relevant motor carrier and vehicle through the mRecords™ platform 13, and all data is automatically transferred when a network connection is available.

As a result of the present invention, drivers, registrants and motor carrier have decreased workload and guaranteed compliancy of trip records when utilizing the mRecords™ platform 13. Users can enter records passively via mobile devices, or through an online portal provided to them for use on a computer, portable or desktop, which mRecords™ platform 13 constantly checks the user-entered records for compliance by comparing these records with existing data from the various sources shown in FIG. 2.

Turning to FIG. 3, shown therein are various components of the present invention. An ENVOY OBII device of the present invention 1 allows connection to a vehicle, pulling fuel, VIN and mileage data from the vehicle. As the device 1 is Bluetooth™-enabled, it is straightforward to pair the device 1 with a mobile device loaded with the mRecords™ (ENVOY) app 2 and enable data transfer to between the two devices 1, 2.

The mobile app 2 of the present invention is paired with the OBII Port Device 1. The mobile app 2 employs its GPS capability to track route, distance and allows the driver to enter hours of service, scan fuel receipts, choose alternative routes and view and display documents relevant to their trips.

All data recorded by the mobile app 2 is transmitted to the mRecords™ cloud-based platform 3 whenever a data connection (network, internet or similar connection) is available. The data is also reviewable at any point from the mobile app 2 operating on a mobile device or via logging into the platform 3 from a web-browser operating on a computer.

Vehicle OBD (Onboard Diagnostics)

All vehicles in the United States, produced after 1996, are required to include an OBD port. This port allows access to a vehicles onboard computer and hence the vehicle's self-diagnostic and reporting capability, allowing diagnostics to be run on a variety of outputs relating to engine and vehicle performance. Included in this are important metrics for trip records, such as:

1) Fuel level and fuel consumption
2) VIN Details
3) Recorded Vehicle Speeds
4) Engine characteristics, such as revolutions per minute For example, when combined with an OBD port adapter which also contains a Bluetooth transmitter this diagnostics data can be read of Bluetooth capable devices such as mobile phones. Combined with the GPS capabilities of the mobile phone, fuel, vehicle mileage and position can be recorded against the vehicle continuously and passively whilst a vehicle is being driven.

Figure 13:
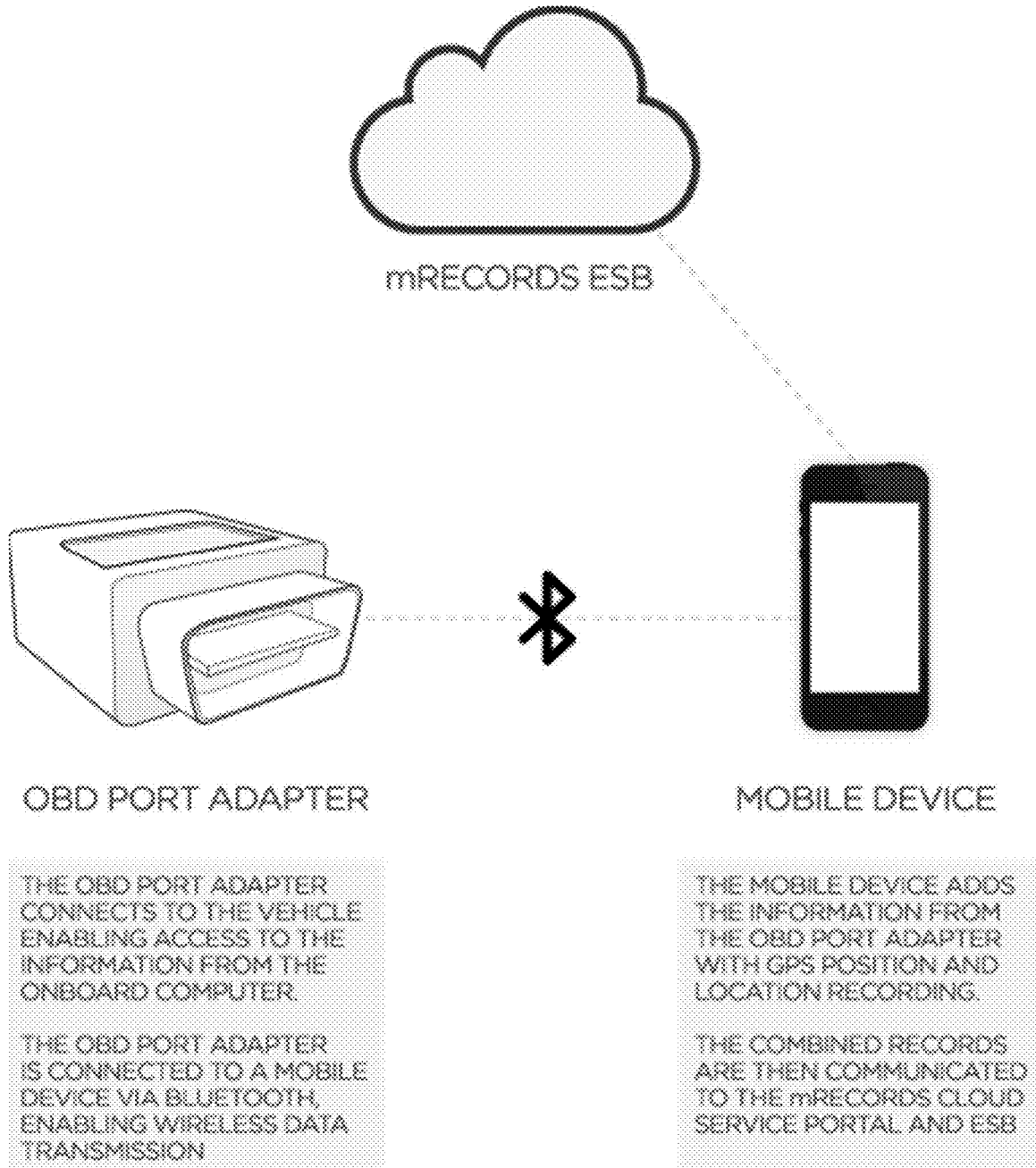
FIG. 13 depicts an exemplary embodiment of the onboard diagnostics interaction with the system of the present invention according to still another aspect of the present invention.

These details are communicated via data connection to the cloud infrastructure, into the connection manager ESB, and then attributing the records to the account in question. See FIG. 13.

Figure 4:
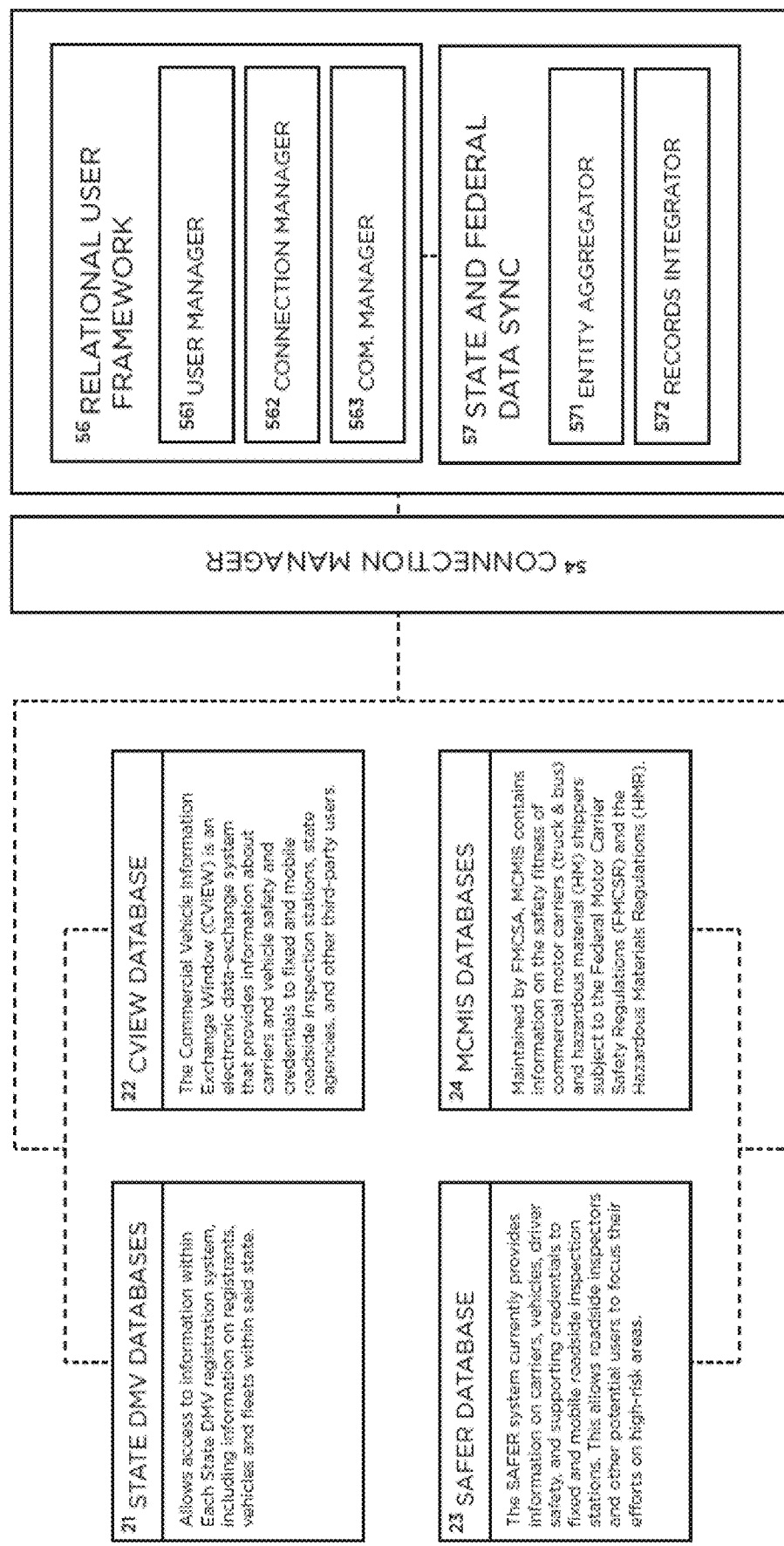
FIG. 4 depicts an exemplary embodiment of the present invention in which a connection manager interfaces with existing government databases according to one aspect of the present invention.

Turning to FIG. 4, shown therein is an exemplary embodiment depicting the interconnection of the present invention to existing government and private sources of information regarding commercial motor carriers according to one aspect of the present invention that. A Connection Manager 54 connects to four main databases, i.e., the State Department of Motor Vehicle (DMV) Databases 21, the SAFER Database 23, the CVIEW Database 22 and the MCMIS Databases 24.

The jurisdictions DMV Databases 21 store information on registrants, vehicles and fleets within each State or Province. ("DMV" in this context implies a jurisdictions division of motor vehicles; such organizations within a State or Province are labeled differently and compartmentalized differently within the jurisdictions, but all conduct substantially similar functions for vehicle and driver registration and licensing.) The Connection Manager 54 provides access to this information from each State or Provincial vehicle registration system. This connection provides quick profile and account building based upon key pieces of information, provided by the user and cross-referenced against the State DMV Databases 21. By starting with information previously recorded in these governmental databases, the platform of the present invention helps ensure accurate information. The Connection Manager 54 couples to the individual State DMVs, allowing the collection and/or verification of data on individuals and registration details. Data integration/access occurs via the following formats and services, for example: (i) Message Queuing (MQ), such as IBM MQ; (ii) Web-services; (iii) File Transport Protocol (FTP); and (iv) Customer Information Control System (CICS).

The Commercial Vehicle Information Exchange Window (CVIEW) 22 is an electronic data-exchange system that provides information about carriers and vehicle safety and credentials to fixed and mobile roadside inspection stations, state agencies, and other third-party users. The data for this service is stored within the SAFER database 23; however, the platform of the present invention maintains a cloud-based version of the CVIEW data which is more readily accessible when needed, via web-service for example.

SAFER Database Connector

In the United States, the SAFER database 23 currently provides information on carriers, vehicles, driver safety, and supporting credentials to fixed and mobile roadside inspection stations. This allows roadside inspectors and other potential users to focus their reports on high-risk factors, which are particular to the entity being inspected. The connection interface to SAFER 23 is accomplished via FTP (for XML file downloads, for example) and evolving to more real-time web services interfaces.

MCMIS Database

Managed by the Federal Motor Carrier Safety Administration (FMCSA), MCMIS 24 contains information on the safety fitness of commercial motor carriers (e.g., trucks and buses) and hazardous material (HM) shippers subject to the Federal Motor Carrier Safety Regulations (FMCSR) and the Hazardous Materials Regulations (HMR). The connection interface to MCMIS 24 is effected by batch or web services interface to the SAFER database 23, for example. As this transitions to the Unified Registration System in the United States (Federal Register/Vol. 78, No. 164/Friday, Aug. 23, 2013, at 52608-62655), similar data elements are required.

State and Federal Data Synchronization

The State and Federal Data Sync 57 is a software component that integrates information gathered from external government data services with (element 53) with data pertaining to users of the mRecords™ platform and their associated records. The State and Federal Data Sync 57 has two components—an entity aggregator 571 and a Records Integrator 572.

Entity Aggregator

The entity aggregator 571 manages the synchronization of user data held by mRecords™ with corresponding data held by state and federal government sources, ensuring continuing consistency between mRecords™ and government sources.

Records Integrator

The records integrator 572 manages the synchronization of records held by mRecords™ with corresponding data held by state and federal government sources (including safety, compliancy etc), ensuring continuing consistency between mRecords™ and government sources.

Figure 5:
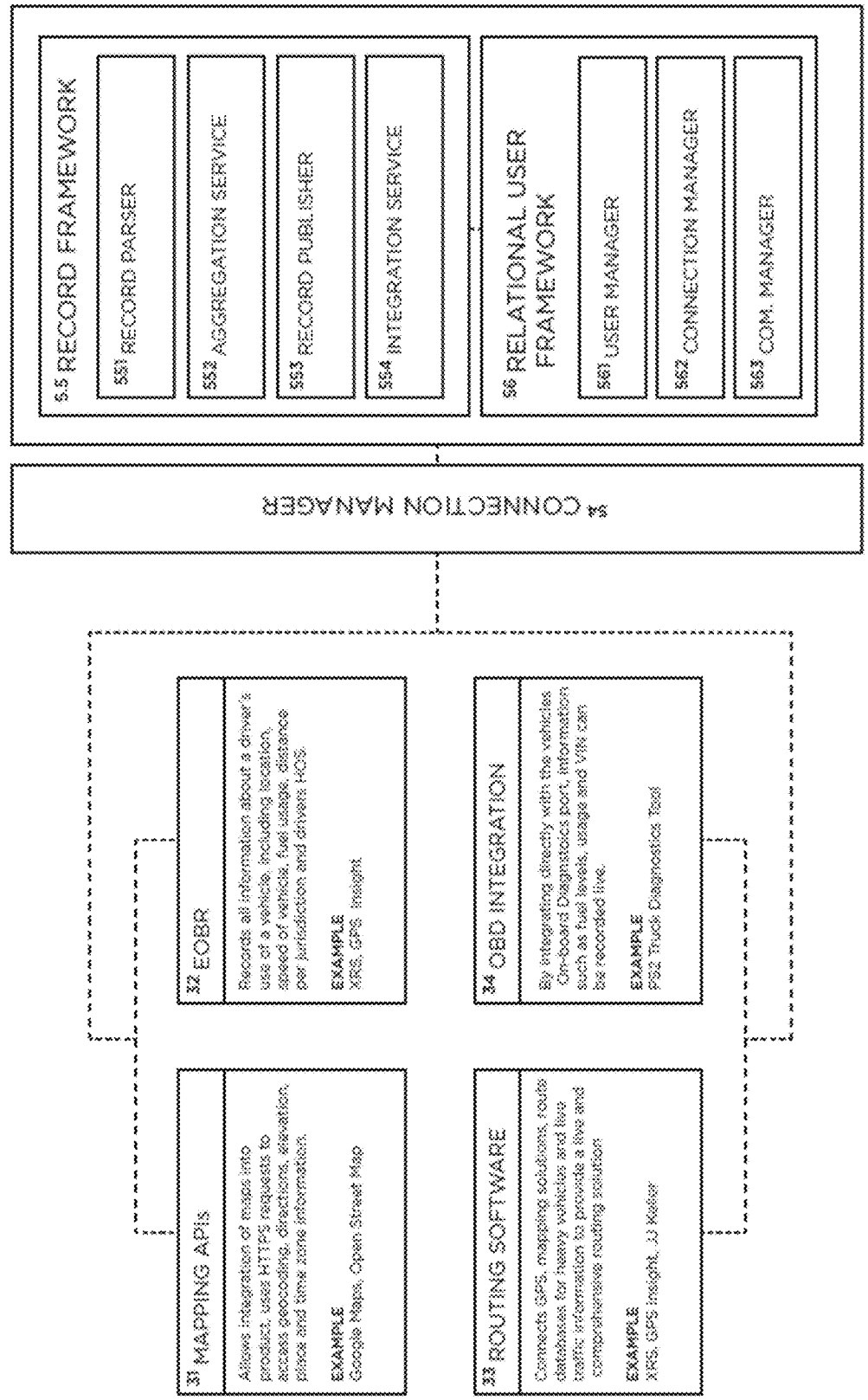
FIG. 5 depicts an exemplary embodiment of the present invention in which a connection manager interfaces with existing commercial software systems according to another aspect of the present invention.

Turning to FIG. 5, shown therein is an exemplary embodiment of a system for integrating data from various outside sources to the mRecords™ platform of the present invention. Some of the outside sources of information are available through existing commercial software.

Mapping Services Integration

The Mapping APIs 31 allow integration of mapping services into the mobile application and mRecords™ platform of the present invention. These mapping services enable live tracking of vehicles, illustrative route guidance and integration with existing routing software.

Connection Interface to Existing Mapping Services

The majority of mapping services provide data integration points through an Application Programming Interface (API) or Software Development Kit (SDK), which allow for rapid integration with other applications. Examples of these are Google®'s mapping API service and JJ Keller's API for integration with their routing and mapping software. The connection manager includes architecture to allow rapid integration of API and SDK.

Electronic Onboard Reporting Integration

The External Connection Manager 54 enables a connection to specified and permitted onboard recording devices with 3G or 4G data connections, such as Electronic OnBoard Reporting (EOBR). These devices are configured to accept mRecords™ IDs and transmit these, as well as the vehicles VIN, trip records and other vehicle specific data (where appropriate) to the mRecords™ platform. The connection interface to the EOBR devices occurs through a web-service connection via 3G or 4G data connection.

Routing Software Integration mRecords™ connects to approved routing software applications 33 by a bespoke plugin within the External Connection Manager 54, enabling users to pick the most appropriate route for their planned journey. This enables a calculation of mileage for users entering trip records via a spreadsheet. The connection to these routing software applications occurs via an API, SDK or web-service.

Onboard Diagnostics Integration mRecords™ is compatible with direct vehicle integration, via a hardware interface with a the vehicle On Board Diagnostics (OBD) port. This connection is communicated to the mRecords™ platform via integration with the hardware device to a mobile device operated by the driver, and connected via a Bluetooth™ interface/connection. These devices are configured to accept mRecords™ IDs and transmit these, as well as the vehicles VIN, trip records and other vehicle specific data (where appropriate) to the mRecords™ platform. The connection to these OBD devices occurs via a Bluetooth™ interface/connection to a mobile/cellular device. The connection to the platform of the present invention from the mobile/cellular device occurs via web-service.

Figure 6:
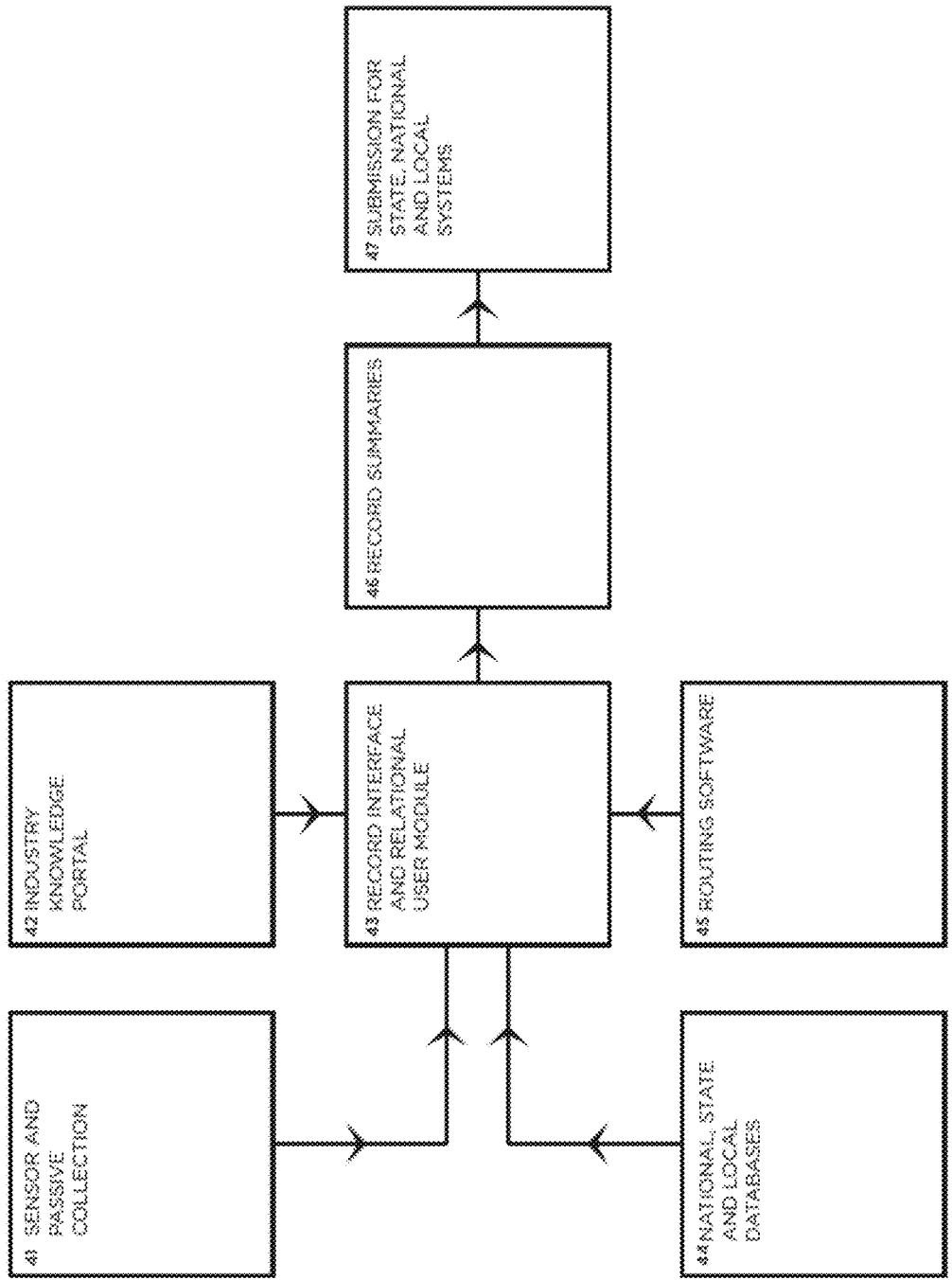
FIG. 6 depicts an integration map in which a plurality of data is integrated into the system of the present invention, processed by the present invention and then output to various government agencies in suitable formats to meet government regulations and reporting requirements according to yet another aspect of the present invention.

Turning to FIG. 6, shown therein is an integration map utilized to build the platform of the present invention.

Sensor and Passive Collection

In element 41, all external data is collected utilizing external hardware for physical location detection and integration with vehicle diagnostics, integrated via the External Connection Manager. The external connection manager is essentially a configurable abstraction layer that allows for the integration of data from external sources. The connection manager will allow connections from devices such as mobile phones (with supported mobile applications) and supported electronic on-board recording devices.

Industry Knowledge Portal

The industry knowledge portal 42 comprises a public facing website with industry knowledge repository, coupled with a 'wizard' to guide users to the information most relevant to their needs and involvement within the motor carrier industry.

The Knowledge Portal is a centralized information repository, based in a public-facing website. The information repository contains all information necessary for each stakeholder within the Motor Carrier industry, including regulatory requirements (e.g., IRP—International Registration Plan, IFTA—international Fuel Tax Agreement, FVHUT—Federal Heavy Use Tax, CDL—Commercial Driver License, etc.) and general information regarding permits, weight restrictions and important contact information and FAQs. The website incorporates a wizard functionality that guides users to information pertinent to their role within the industry (Registrant, Motor Carrier Responsible for Safety, Driver, or Process Agent), as well as profiles having to do with operations in various aspects, including but not necessarily limited to types of operation and cargo, vehicle, and business arrangements (such as Lessor, Lessee, Shipper, Consigner, Private, Household Goods). The wizard, which includes definition of user, role, and business profile, assists the invention to tailor process, schedule, data exchange and transformation, and information requirements.

Once a user of the Knowledge Portal is registered with the mRecords system, the information can be even further tailored to their specific needs, based upon the unique information stored about them in their account. Whereas the Knowledge Portal is a generalized information repository with some filtration based upon role, when combined with specific user information in mRecords, users can be advised of all the regulatory requirements and obligations that need to be addressed as they arise. For example—mRecords will alert Registrants that they are due for renewal, and advise them of any actions they need to take on their records to ensure they are compliant and provide the necessary tools. If a fleet has been chosen for audit, mRecords can advise them of the situation, or they can choose to advise the platform of upcoming events/requirement themselves, and then allow the system to advise them as to how best achieve compliancy for the event/requirement in question.

Record Interface and Relational User Module

Figure 7:
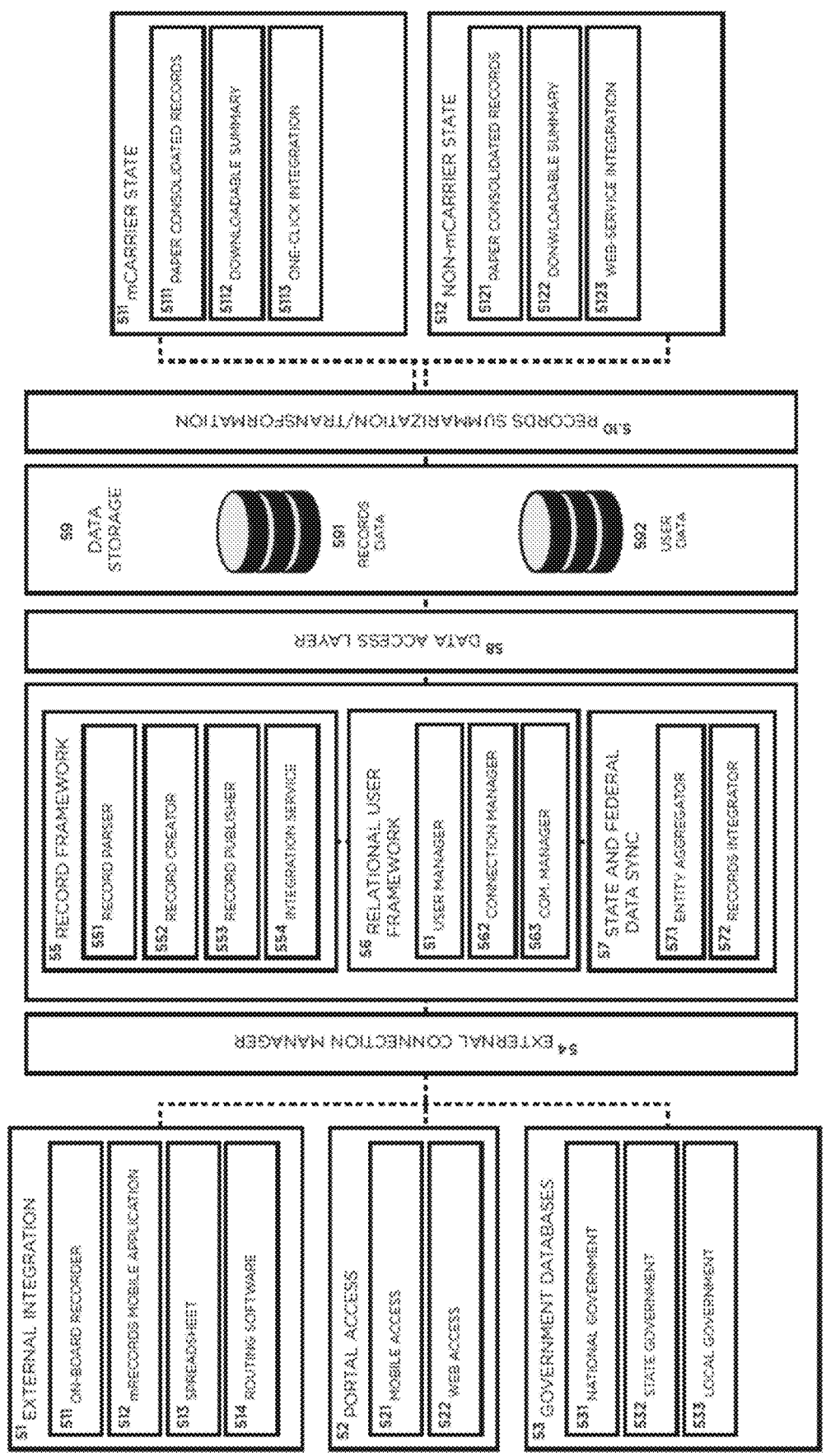
FIG. 7 depicts an exemplary embodiment of a record interface and a relational user module according to still another aspect of the present invention.

This module 43 is described in relation to FIG. 7.

National, State and Local Databases

In element 44, this information is collected as described with reference to FIG. 4.

Routing Software

This software 45 is described with reference to FIGS. 5 and 7. This software is integrated with the system via the ESB, and can come from multiple sources. Connects GPS, mapping solutions, route databases for heavy vehicles and live traffic information to provide a live and comprehensive routing solution.

Record Summaries

In this element 46 the process of collation, summarization and formatting of collected records sets into sets of data applicable to a given compliancy process such as an audit or renewal is performed. See FIG. 8.

Submission for State, National and Local Systems

In element 47, the records are further transformed to formats required by individual or all governmental authorities. See FIG. 9.

Turning to FIG. 7, shown therein is the Record Interface and Relational User Module 43. This module 43 comprises an External Integration Module 51, a Portal Access Module 52, and An Access Module 53 to access government databases as described previously.

The External Integration Module 51 includes an Onboard Recorder 511, an mRecords™ Mobile Application 512, a Spreadsheet 513 and Routing Software 514.

Onboard Recorder

The Onboard Recorder 32 has been described with reference to FIG. 5.

mRecords™ Mobile Application

The mRecords™ Mobile Application 512, which enables connection to the mRecords™ platform, comprises an HTML5 application with web-service integration to the main platform, allowing integration with mapping APIs, onboard recording hardware and other external devices via a Bluetooth™ or similar connection.

Portal Access

Portal access 52 includes a web-based interface 522 for access to the platform for both mobile access 521 and standard web-access.

External Connection Manager

The Connection Manager 54 is an abstraction layer and data access service that allows for communication between the mRecords™ platform and external data services, both at a government and commercial level. The connection manager 54 is flexibly configured to accept communications in a variety of ways. It is designed as an open-pluggable architecture, allowing rapid addition of new data connection plugins should these be required in the future and can be configured to accept or deny access to/from existing services at any point in time.

Amongst others, the Connection Manager 54 allows connections to/from external services through the following methods: (i) Web-service; (ii) FTP; (iii) API; and (iv) SDK.

Record Framework

The Record Framework 55 includes the Record Parser 551, the Record Creator Service 552, the Record Publisher 553 and the Integration Service 554.

Record Parser

The Record Parser 551 is a module within the Record Framework 55 that enables continuous and on-request parsing, auditing and error logging for all records logged by a user within the system. The Record Parser 551 checks constantly for inconsistencies within records, including gaps in odometer readings, incorrect or inaccurate mileage recording and any and all factors that cause non-compliancy in a renewal or audit scenario.

Record Creator

The Record Creator Service 552 is a module that enables the recording, search, aggregation and editing of records for individual users. It also enables the maintenance of records from vehicles that have been sold during a registration year, enabling a complete set of compliant records to be maintained and accessed by the user. The Record Creator module 552 is accessed by users through a web portal, and allows for direct creation, reading, editing and deletion of records in the browsers, as well as the uploading of records via approved file formats (XML, CSV, etc.).

Record Publisher

The Record Publisher 553 is a module that enables the production of a viable set of records for submission, either in paper or electronic format (depending on the end use).

Integration Service

The Integration Service 554 is a module that enables the addition of records from external services rather than via direct input through the web-portal. Access to these services is setup and managed through the main web portal. A user can add new approved integration methods through the module interface and remove them at a later date should they wish to.

Relational User Framework

The Relational User Framework provides user networking based upon business roles within the Motor Carrier industry, enabling stakeholders—Registrants, MCRS (Motor Carrier Responsible for Safety), Drivers and Process Agents—to communicate effectively with existing users, create a set of controls over records created by users (for Registrants and Motor Carriers) and enable stakeholders to create new connections with potential business partners through the mRecords™ platform.

Figure 10:
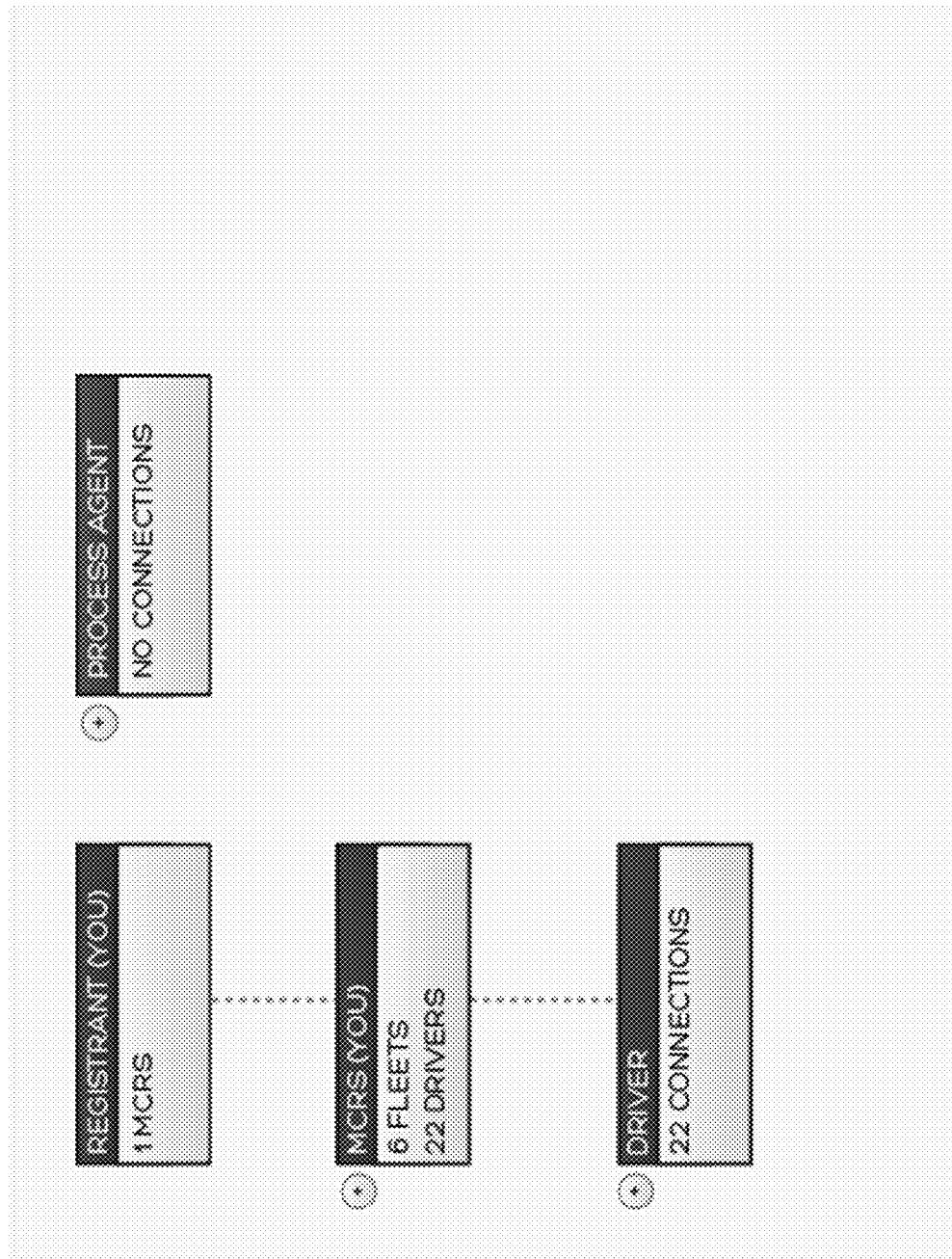
FIGS. 10-12 depict exemplary embodiments of certain aspects of the relational user framework in a diagrammatical format showing the interrelationship among certain users of the system of the present invention according to yet another aspect of the present invention.

All users are assigned a unique ID and associated role within the mRecords™ platform, based upon their registration with the platform and the information recorded against their details in Local, State and Federal databases (USDOT Numbers, etc.). From this, users are able to make connections as permitted by the permissions/characteristics of their user role. The user permissions are hierarchical, with permissions dependent upon the position of the role within this hierarchy. A typical example of this hierarchy as applied to a Registrant who is also a MCRS would be as shown in FIG. 10.

In this case, a registrant can create connections to Process agents, and MCRS, as well as adding new drivers to their fleet.

Figure 11:
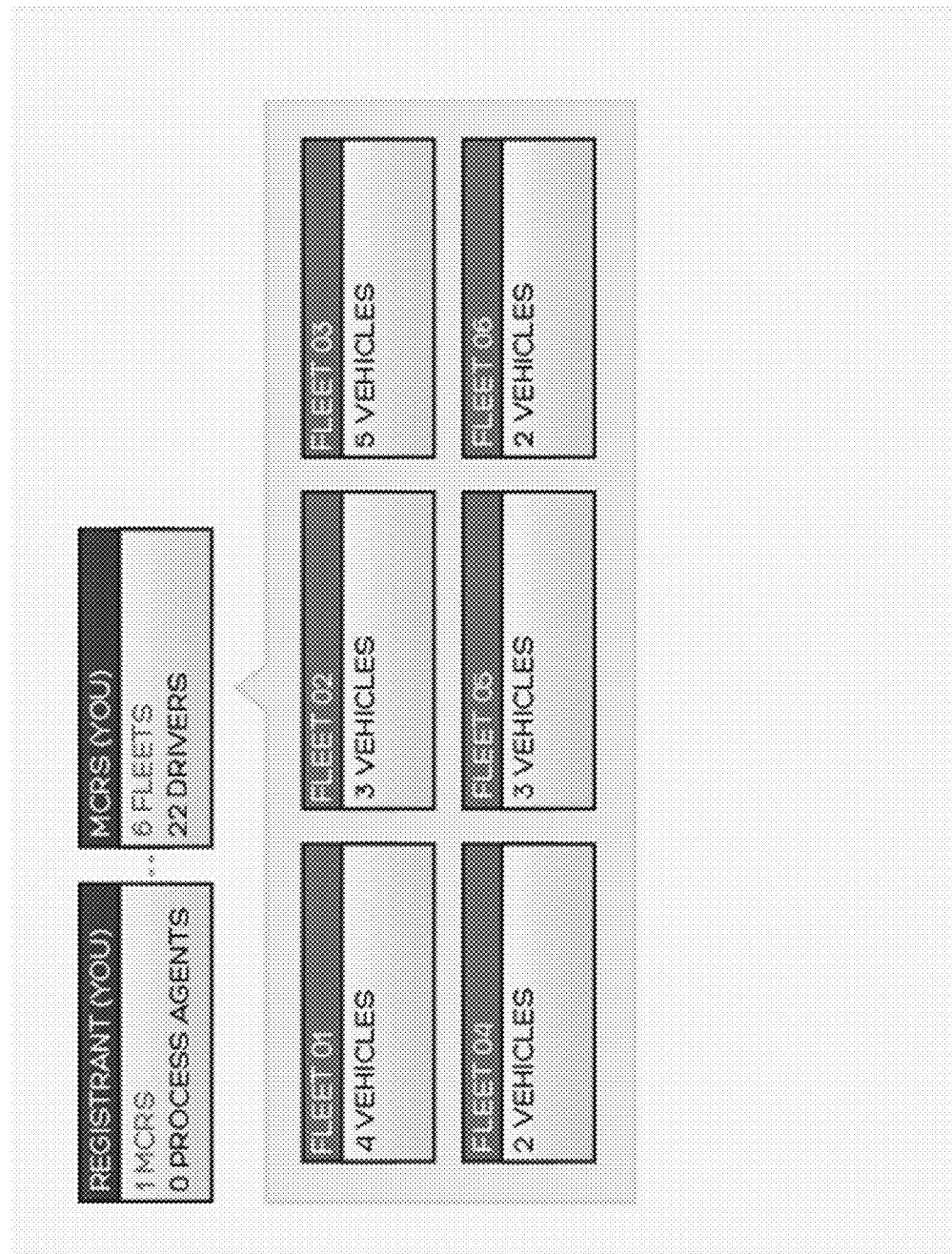

If they wanted to explore their connections, a view of these would be available—for example, this view shows an illustration of the fleets attributed to their MCRS (which in this case is themselves). See FIG. 11.

Figure 12:
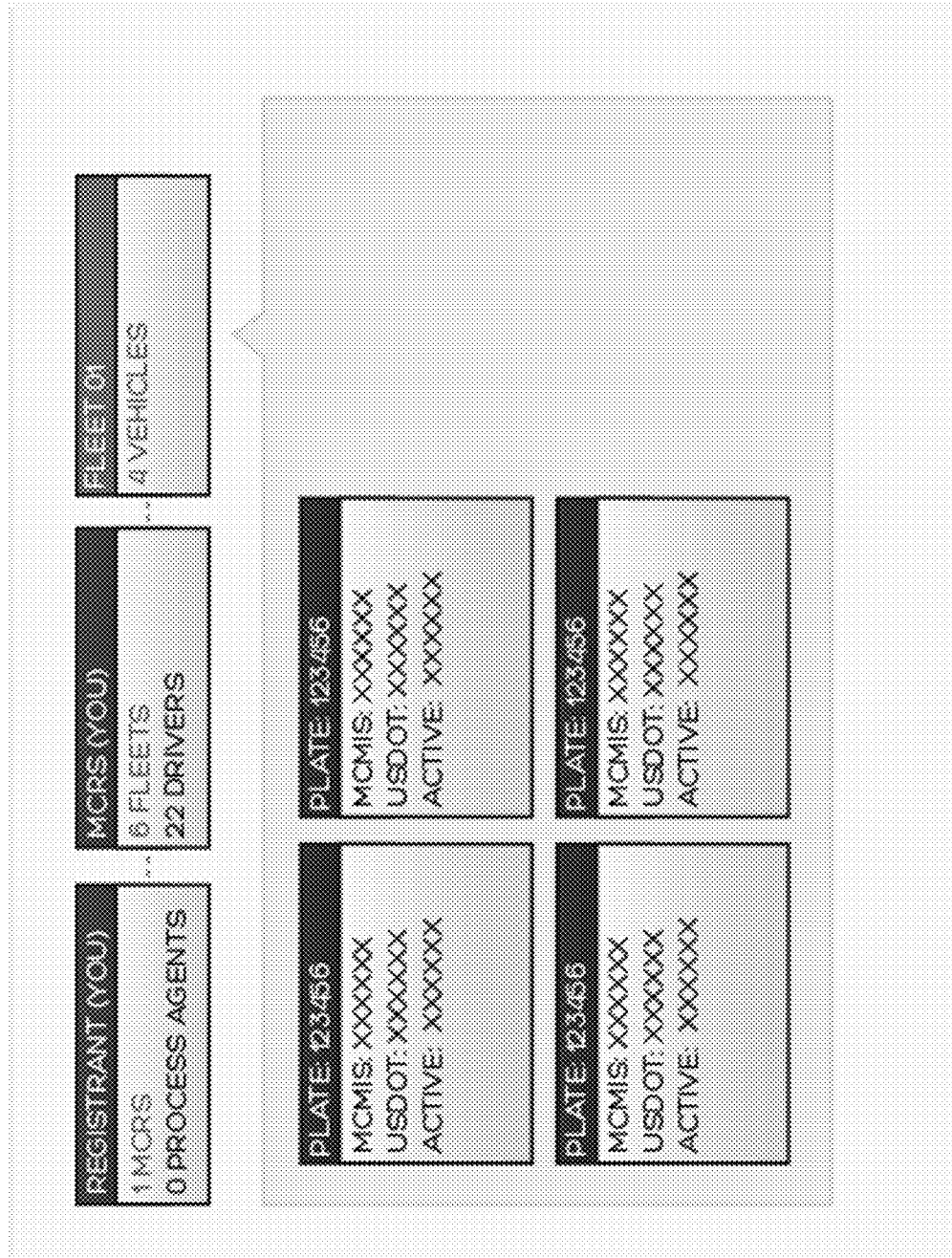

Additionally, FIG. 12 shows the vehicles within those fleets, attributed to that MCRS. Note, the option to view the drivers connected to this MCRS is also possible.

User Manager

The user manager 561 is a module that enables the management of the user's accounts and information. The manager allows for updates to the user profile through automatic synchronization with government records, as well as through direct access from the user themselves via a web-based portal. The user manager accesses stored data on each user via the mRecords™ Data Access Layer, and also writes updates to this data set by the same service. It also seeks updates from government data sources via integration with the State and Federal Data Sync module.

Connections Manager

The Connections Manager 562 manages all relationships between individual users based upon their roles within the overall system hierarchy. These connections include driver to motor carrier connections, registrant to motor carrier and registrant to process agent based connections.

Communication Manager

The Communication Manager 563 allows for direct in-application messaging to work between connected users, via email and instant messaging.

State and Federal Data Synchronization

Data Access Layer

This layer 58 or module of the mRecords™ architecture layer provides simplified access to both records and user data stored within the platform.

Data Storage

The Data Storage module 59 of the platform enables rapid access to user and records data, separated by the rest of the application via a data access layer.

Records Summarization/Transformation

This module 510 connects with the Data Storage Module 59 and transforms the records into viable formats for renewals and/or audits in both mCarrier™ integrated states and non mCarrier™ integrated states. The Transformation 510 provides outputs that enable automatic (in the case of mCarrier™ states) or rapid consumption of the records for significantly increased processing times at government locations. These formats are both digital and paper-based, and are only produced once the mRecords™ system has ensured that the record set is compliant with government requirements.

Figure 8:
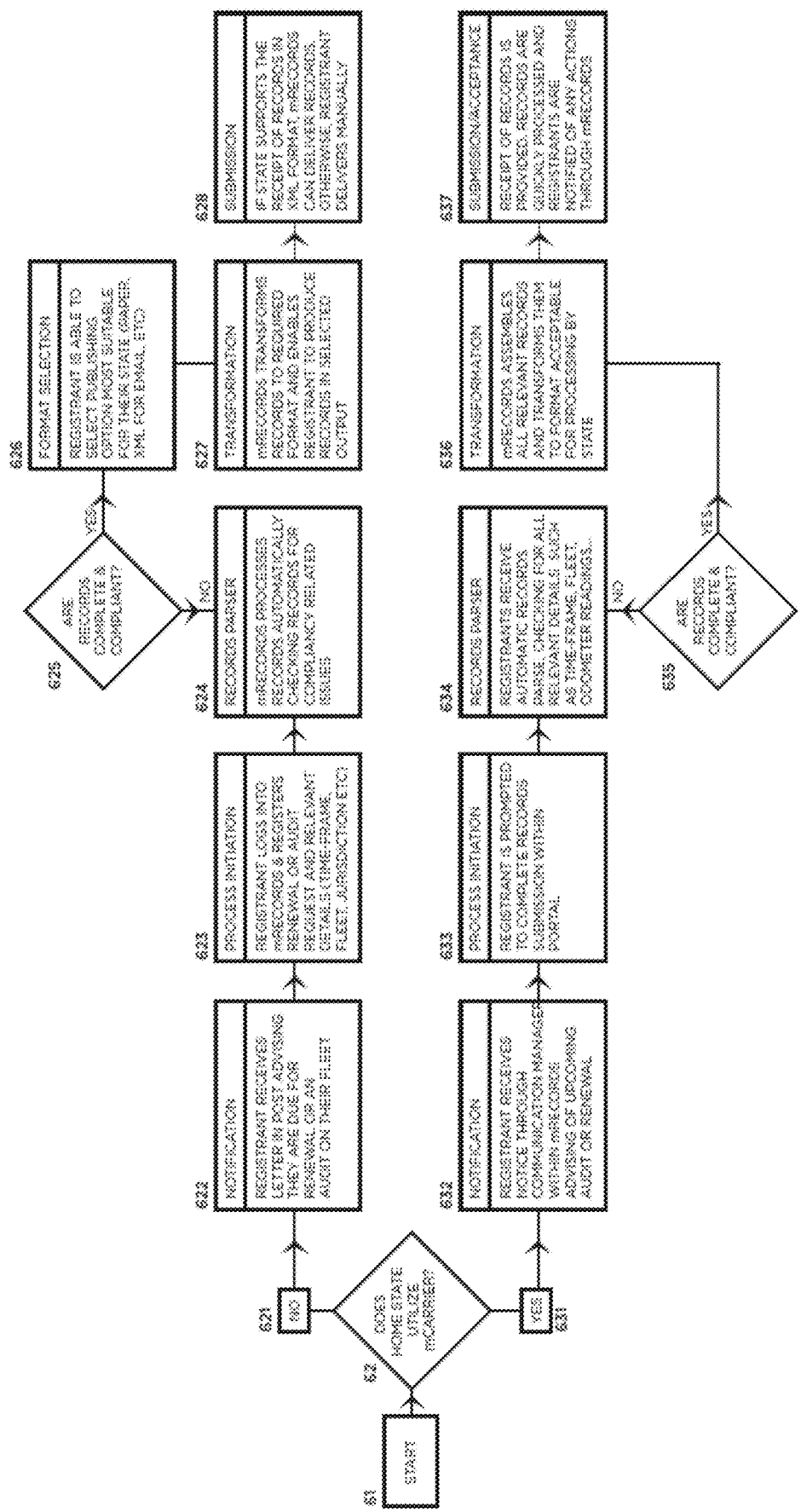
FIG. 8 depicts an exemplary embodiment of a record summarization process according to yet another aspect of the present invention.

Turning to FIG. 8, shown therein is the Record Summarization process 600. This diagram represents the process flow for record summarization within the mRecords™ platform. It contains two distinct paths, one with a seamless integration into a mCarrier™ integrated state (i.e., a state that utilizes the mCarrier™ platform), and a non-mCarrier™ integrated state (i.e., a state that does not utilize the mCarrier™ platform).

The process starts in element 61. First, it is determined if the registrant fleet's "base" jurisdiction utilizes the mCarrier™ platform? If so, the process moves to element 631, else to element 621. In element 622, registrant receives letter in post advising they are due for renewal or an audit on their fleet. This is initiated by the regulating authority, for example. In element 623 the automated process begins, the registrant logs into the mRecords™ platform and registers a renewal or audit request and relevant details (timeframe, fleet, jurisdiction, etc.). In element 624, the records parser automatically checks records for compliancy related issues. In element 625, the platform determines whether the records are complete and compliant, and if so moves to format selection. If not, the process moves back to the records parser. In format selection 626, the registrant is able to select the publishing option most suitable for their state (paper, xml for email, etc.). The process then moves to transformation, in which the platform transforms records to the selected/required format and enables the registrant to produce records in the selected output format. The process then moves to submission 628, in which, if the state supports the receipt of records in XML format, the platform delivers records to the state, otherwise, the registrant prints out the records and delivers them manually.

If the state does utilize the mCarrier™ platform, the process moves to notification 632, in which the registrant receives notice through the communication manager within the system advising the registrant of an upcoming audit or renewal, and the process then moves to process initiation 633, in which the registrant is prompted to complete records submission within the records portal, and the process moves to the records parser 634. In the records parser 634, the registrants receive automatic records parse, checking for all relevant details such as timeframe, fleet, odometer readings, etc. If the records are complete in element 635, the process moves to transformation 636, otherwise the process returns to records parser 634. In transformation 636, the mRecords™ platform assembles all relevant records and transforms them to a format acceptable for processing by the registrant's state, and the process moves to submission/acceptance 637 in which receipt of records is provided, records are quickly processed and registrants are notified of any actions through the mRecords™ platform.

Records Parsing

Active Form Validation

If a user is filling in their records online (rather than populating records via passive record population) then mRecords provides in-form validation on each field, allowing immediate correction of errors. For example:

1. Date of Trip (Starting and Ending)
2. Trip Origin and Destination

Establishes possible routing options and potential mileage options. Also establishes expected mileage range for trip.

3. Route of Travel

Enables checking of indicated route against reported mileage, enabling validation of recorded mileage, identification of miles per jurisdiction and guidance on future trip planning based upon roads used and weight of vehicle/load.

4. Starting and Ending Odometer Readings mRecords checks odometer readings from previous records, enabling for ongoing continuity of odometer readings in a larger records set. For instance—if a new trip is recorded for the vehicle, and the starting odometer reading doesn't match that of the final odometer reading of the previous trip, an alert will be raised, advising of the gap and associated missing miles.

5. Total Trip Miles/Kilometers

This is checked to ensure recorded miles matches odometer reading, avoiding any non-declared miles or gaps in odometer readings remaining unidentified.

6. Fuel Reporting Validation

Reported fuel consumption and fuel replenishment, whether by purchase or bulk and including both fossil-based and other fuel types, and duel-fuel and hybrids, are validated against reported mileage, trip duration, route and odometer readings and measured against known fuel consumption for specified vehicle/trailer/weight combination. This validation also enables cross-validation with both IRP and IFTA fuel reporting by the registrant for the vehicle/s in question. The 6. Unit Number and/or Vehicle Identification Number (VIN)

Trips cannot be saved as a complete record in the mRecords™ platform without a valid Unit Number and/or VIN. Unit number is a vehicle identifier made by the fleet registrant, and is free form. VIN is assigned to a vehicle by the original equipment manufacturer, and may be tested via a published algorithm and be tracked via both government and commercial databases.

7. Vehicle Fleet Number

Trips cannot be saved as a complete record in the mRecords™ platform without a valid Fleet Number for the vehicle in question, if the vehicle is defined as a commercial vehicle.

8. Trailer Number

Trips cannot be saved as a complete record in the mRecords™ platform without a valid trailer number(s) unless the trip is identified as a bobtail trip or if the vehicle is not a tractor-trailer combination.

9. Driver/s' Names

A driver(s) must be applied to all trips, generally. Drivers should be registered as a user within the mRecords™ platform, enabling cross checking against government sources for any outstanding issues with registered drivers. Notably, autonomous vehicles (driverless) are emerging that will relax this requirement.

10. Drivers' Hour of Service Records

Checks Hours of Service (HOS) records as they're being entered—provides alerts and guidance for trips with HOS issues.

Figure 9:
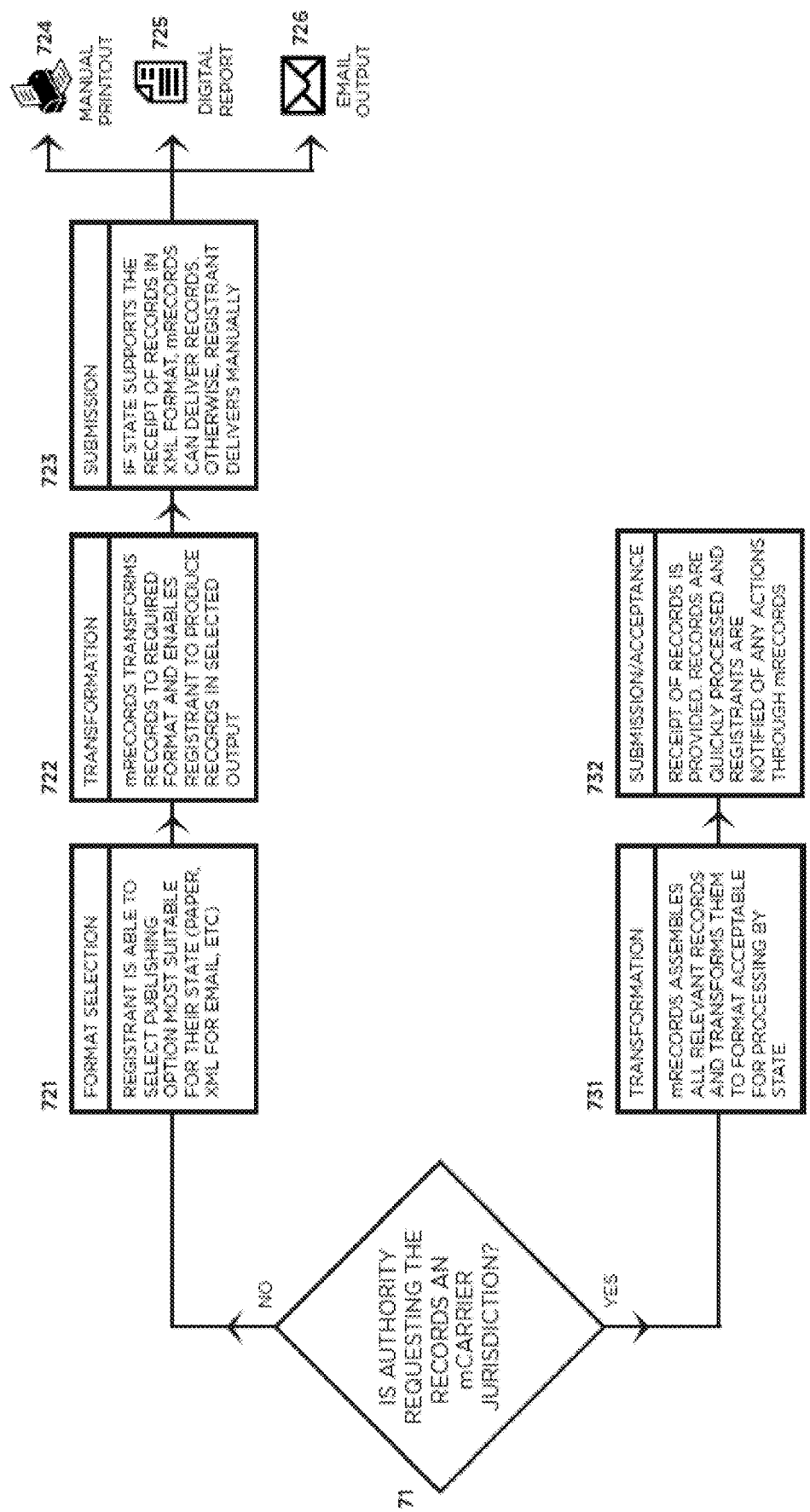
FIG. 9 depicts an exemplary embodiment of a data format submission process according to still another aspect of the present invention.

Turning to FIG. 9, shown therein is the process for submission to State, National and Local Systems. This diagram represents the process flow for record submission within the mRecords™ platform. It contains two distinct paths, one with a seamless integration into a mCarrier™ integrated state, and a non-mCarrier™ integrated state. The former allows for almost instantaneous submission and acceptance, whereas the latter necessitates multiple outputs, including digital, paper-based reports and results to email generation.

If in element 71 the authority requesting the records is a jurisdiction served by mCarrier™, then transformation begins in 731, in which the mRecords™ platform assembles all relevant records and transforms them to a format acceptable for processing by the requesting authority, and the process moves to submission/acceptance 732. In submission/acceptance receipt of records is provided; and records are quickly processed and registrants are notified of any actions through the mRecords™ platform.

If the requesting authority is not served by mCarrier™, the process moves to format selection 721, in which the registrant is able to select the publishing option most suitable for their state (paper, xml for email, etc.) and the process moves to transformation 722. In transformation 722, the system transforms the records to the required format and enables the registrant to produce records in the selected output and the process moves to submission. In the state supports the receipt of records in XML format, the system delivers the records electronically, otherwise the system enables the registrant to deliver the records manually, either by printout 724, digital transport 725 or email 726.

Application Physical and Network Infrastructure

The mRecords™ platform is run within either a hosted cloud infrastructure with scalable virtual machine computing, or on virtual machines on an physical server within an internal business network. Physical and virtual machine number and setup can be scaled to support demands on platform.

Physical Machines

Figure 14:
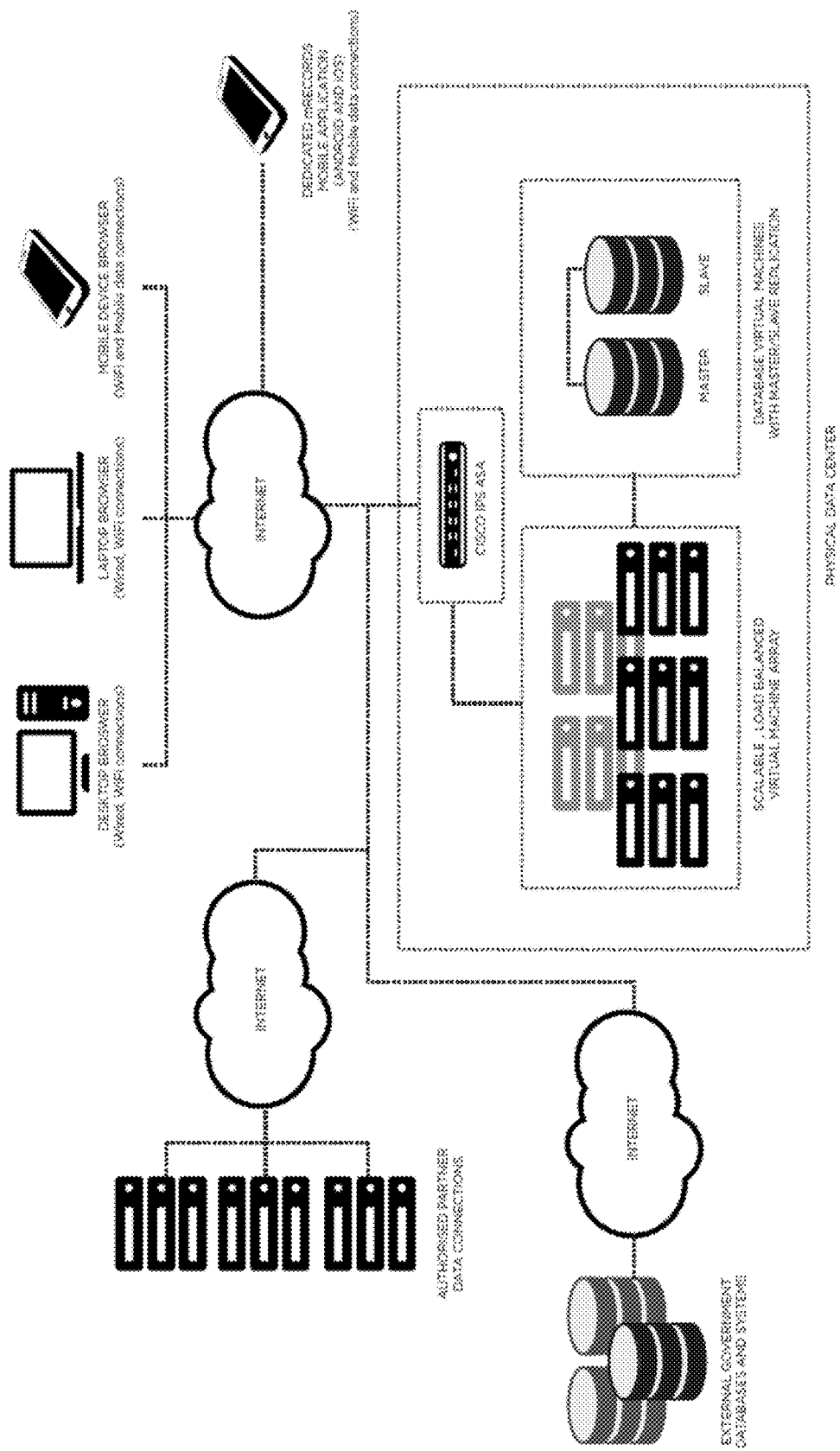
FIG. 14 depicts an exemplary embodiment of a hardware implementation of the system of the present invention according to yet another aspect of the present invention.

With reference to FIG. 14, the following comprises one possible embodiment of the invention, but not the only possible implementation. Other implementations would be apparent to those of skill in the art based on this embodiment.

Three browsers running on desktops, laptops or mobile devices can be used to connect to the platform via the Internet or other network. Authorized partner data connections can be made to the platform over the Internet or other network as well. Dedicated mobile apps can access the platform via the Internet too. External government databases and systems may also access the platform via the Internet or other network. The entry point to the physical data center is a Cisco IPS ASA and a scalable, load balanced virtual machine array accessing a database of virtual machines with master/slave replication.

| | |
|---|---|
| Processor: | Intel Xeon E5-2643 x2 3.50 GHz, 25M Cache 8.0 GT/s QPI, Turbo, HT, 6C, 130 W Max Mem 1866 MHz |
| Additional Processor: | Intel Xeon E5-2643 x2 3.50 GHz, 25M Cache 8.0 GT/s QPI, Turbo, HT, 6C, Max Mem 1866 MHz |
| Memory DIMM Type and Speed: | 1600 MHz RDIMMS |
| Memory Configuration Type: | Performance Optimized |
| Memory Capacity | 16 GB RDIMM, 1600 MY/S, Low Volt, Dual Rank, 16GBRLR x4 Data Width |
| Operating System | Windows Server 2012R2, Standard Edition, Factory Inst, No MED, 2SKT, 2VM, NOCAL |
| OS Media Kits | Windows Server 2012RD, standard Edition, Media Kit |
| RAID Configuration | RAID 5 for H710P/H710/H310 (3-16 HDDs) |
| RAID Controller | PERC h710P Integrated RAID Controller. 1 GB NV PH710PI Cache |
| Hard Drives | 1TN 7.2K RPM SATA 3 Gbps 3.5 in Hot -plug Card |
| Embedded Systems Management | iDRACV Enterprise |
| Select Network Adapter | Intel Ethernet I350 QP 1 GB network Daughter Card |
| PCIe Riser | Risers with up to 6 x8 PCI Slots + 1, x16 PCIe slot |
| Add-in Network Adapter | Intel Ethernet I350 QP 1 GB Server Adapter |

Virtual Machines
Minimum Setup

| Processor: | 1.4 GHz 64-bit processor |
|---|---|
| Memory | 512 MB |
| Hard Disk | 32 GB |
| OS | Windows Server 2012R2 |

Processor:
RAM: 512 MB
Disk Space: 32 GB
Recommended Setup

| Processor: | 1.8 GHz 64-bit processor |
|---|---|
| Memory | 2 GB |
| Hard Disk | 200 GB |
| OS | Windows Server 2012R2 |

Application Server:
Apache Tomcat

The mRecords™ platform may be deployed on Apache Tomcat. Apache Tomcat (or simply Tomcat, formerly also Jakarta Tomcat) is an open source web server and servlet container developed by the Apache Software Foundation (ASF). Tomcat implements the Java Servlet and the JavaServer Pages (JSP) specifications from Sun Microsystems, and provides a "pure Java" HTTP web server environment for Java code to run in. In the simplest configuration Tomcat runs in a single operating system process. The process runs a Java virtual machine (JVM). Every single HTTP request from a browser to Tomcat is processed in the Tomcat process in a separate thread.

Networking
Own Server
Cisco ASA IPS System
Windows Firewall
External Cloud-based Provider Cloud provider's internal network controls, intrusion protection controls and firewall settings.

Database

The platform is database agnostic—the database connector (a component of the data access layer) allows for connection to and deployment of the platform's data to multiple database technologies including but not limited to:
MySQL
Microsoft SQL Server
Oracle
PostgreSQL User Access Users can access the platform via any web browser capable of supporting HTML5, Javascript and CSS3 on both Windows and Macintosh computers.

Desktop, laptop browser access
Windows Machines Browsers
IE, 8, 9, 10
Chrome 25
Firefox 20
Opera 15
Apple Mac Machines Browsers
Chrome 25
Firefox 20
Opera 15
Safari 5.1, 6
Mobile/tablet access
Mobile Browsers
Safari (iOS)
Chrome (iOS)
Chrome (Android)
Microsoft Explorer (Windows Phone)
Mobile Application The dedicated mobile application will be available on both iOS, Android and Window's phone mobile operating systems.

CONCLUSION

Although various embodiments are specifically illustrated and described herein, it will be appreciated that modifications and variations of the invention are covered by the above teachings and within the purview of the appended claims without departing from the spirit and intended scope of the invention. For example, certain interface protocols and data formats have been specified, but as the standards for these are ever evolving, new or different interface protocols and data formats may be employed without departing from the scope of the invention. Furthermore, these examples should not be interpreted to limit the modifications and variations of the invention covered by the claims but are merely illustrative of possible variations.

What is claimed is:

1. An apparatus for collecting, managing and processing records for a transportation operation comprising:
an on-board diagnostics port adapter to be coupled to an on-board diagnostics port on a vehicle, said on-board diagnostics port adapter to interact with a computer in the vehicle via said on-board diagnostics port, and said on-board diagnostics port adapter including a transmitter to transmit data received from the computer in the vehicle via the on-board diagnostics port, said data including fuel consumption, vehicle identification number, and vehicle speed;
a handheld computing device including a receiver to receive the data transmitted from the transmitter in the on-board diagnostics port adapter, said handheld computing device including a network communicator to transmit the data from the on-board diagnostics port adapter over a communication network; and
a records platform to receive the data from the handheld computing device and including a processor and a database to store a plurality of records regarding the transportation operation, said records platform comprising: (i) a records summarization and transformation module; (ii) an external communication manager; (iii) a relational user framework; and (iv) a knowledge portal; wherein:
said records platform receives one or more trip records entered by one or more users via said handheld computing device;
said records summarization and transformation module includes a records aggregator that continuously checks said one more trip records for compliance issues, including continuous odometer readings, recorded mileage consistency, and reported mileage versus approximate route distances to identify a non-compliant trip record among the one or more trip records;
said records aggregator sends an error flag to a responsible user of the one or more users upon detecting a compliance issue, including a mileage inconsistency, in said non-compliant trip record of the one or more trip records;
said records summarization and transformation module includes a records publisher to publish one or more government required records in one or more predetermined formats required by one or more government entities and said records publisher automatically compiles and electronically submits one or more government required records to said one or more government entities;

said records aggregator prevents said non-compliant trip record from being published by said records publisher to said one or more government entities upon detecting said compliance issue;

said records platform receives a compliant trip record entered by said responsible user to replace said non-compliant trip record;

said records aggregator checks said compliant trip record entered by said responsible user for compliance and permits said compliant trip record to be published by said records publisher said one or more government entities if said compliant trip record is in compliance;

said relational user framework includes a profile builder that integrates with one or more governmental systems to build a profile for each new user based on one or more vehicle records held by said one or more governmental systems, and a new user profile is based on a new user's relationship to a vehicle registered with said one or more governmental systems;

said external communications manager comprises an enterprise service bus which is a central bus via which a plurality of external services communicates whilst providing an abstraction layer over one or more underlying details being communicated;

said external communications manager enables one or more connections to one or more government databases independent of database type by providing an application programming interface to unify communications between the records platform and said one or more government database;

said external communications manager abstracts information received from said one or more government databases before transferring said information received from said one or more government databases to other modules within the records platform.

2. The apparatus according to claim 1, wherein:
said records summarization and transformation module stores and maintains records for one or more users, drivers or companies.

3. The apparatus according to claim 1, wherein:
said records summarization and transformation module captures data and transforms data into actionable information for automated generation of supplemental transactions for one or more vehicles, individually and as a fleet of vehicles; and said records summarization and transformation module applies an user, a role, and a business profile or a metadata to specify and manage records summarization and transformation as appropriate to contemporary process and regulatory requirements.

4. The apparatus according to claim 1, wherein:
said records summarization and transformation module maintains records to enable generation of information in compliant content and context for accurate supplemental transactions, including original applications, renewals, and change supplements;

said records summarization is generated to include tests of compliancy, and correlatively demonstrating errors or potential errors and omissions, with regard to the summarized information and the underlying records;

said records summarization and transformation module supplements records generated by said one or more users or one or more users' systems with information from other databases accessed by the platform via the external communication manager to reduce manual operations and manual effort required by said one or more users; and said records summarization and transformation module enables identification of informational or documentary artifact requirements by user correspondents, enabling one or more users to identify requirements, correspondent user or users to provide information to satisfy the requirements, and correspondent users to approve, deny, modify, annotate, and apply the provided information as relevant to an user process or a business operations requirements.

5. The apparatus according to claim 1, wherein:
said records summarization and transformation module enables formulation of all or a significant subset of information of a user in a format that enables a base, registration, or certifying jurisdiction to act on a registrant-generated request with reduced manual operations and effort; and said records summarization and transformation module enables flexibility within methods of records ingestion, using structured and/or unstructured information methods, to extract, store, and manage data inherent in transportation operations including fleet, vehicle, cargo, fuel, driver, safety, roadway, time, or other operational characteristics of operations, so that the records are usable for fleet registration, tax, planning, and operational actions and transactions.

6. The apparatus according to claim 1, wherein:
said records summarization and transformation module enables substantiating records for supplements, such as historical movement records associated with fleets or vehicles, are related to supplemental transactions, so that manual or automated reports or other methods of research will enable formulation, optimization, or verification of supplemental requests; and said records summarization and transformation module enables usage of records per fleet, driver, shipper, or other attribute to aggregate, summarize, report or transmit audit data to substantiate original, cross-fleet, renewal, or change supplements based on auditable detailed vehicle movement, cargo, fuel, or driver records.

7. The apparatus according to claim 1, wherein:
said records summarization and transformation module enables usage of aggregated, summarized, reported or transmitted records for fleet, driver, shipper, or other attribute for automated analysis of original, cross-fleet, renewal, or change supplement based on auditable detailed vehicle movement, cargo, fuel, or driver records in order to analyze, assess, validate, or recomputed historical supplements; and said records summarization and transformation module enables usage of aggregated, summarized, reported or transmitted records for fleet, driver, shipper, or other attribute for automated analysis of original, cross-fleet, renewal, or change supplement based on the auditable detailed vehicle movement, cargo, fuel, or driver records in order to analyze, assess, validate, or recomputed historical records as required by governmental, motor carrier, or registrant requirements.

8. The apparatus according to claim 1, wherein:
said records summarization and transformation module enables extraction of specific data elements from web-based systems, integration with requirements of established business processes to create a records extract or complete auditable record, which may then be verified using external information, enabling a person or a system providing the data to complete or correct individual or multiple records; and
said records summarization and transformation module enables extraction of specific data elements from on-board (in-vehicle) recording devices, integration with the requirements of established business processes to create a complete or partial auditable record that may be verified using external information, enabling the person or system providing the data to complete or correct individual, or multiple records.

9. The apparatus according to claim 1, wherein:
said records summarization and transformation module enables extraction of specific data elements from written records, integration with a plurality of requirements of established business processes to create a complete or partial auditable record that may be verified using external information, enabling a person or a system providing a data to complete or correct the record; and
said records summarization and transformation module enables organization of the records by fleet, driver, shipper, or other attribute to enable aggregated, anonymized, summarized, reported or transmitted, to enable creation of original, cross-fleet, renewal, or change supplement with linkage to an auditable detailed vehicle movement, cargo, fuel, or driver records.

10. The apparatus according to claim 1, wherein:
record keeping data extraction is managed by the external connection manager; and
said records platform includes a records framework to manage integration with internal business processes.

11. The apparatus according to claim 1, wherein:
said records platform includes a records framework to manage organization of records in conjunction with user information managed by the relational user framework; and
transformation of the records is managed by the records summarization and transformation module.

12. The apparatus according to claim 1, wherein:
said records platform includes a records framework to manage records to enact generalized and specific views of registration, tax, planning, and operational transactions relevant to a stakeholder in the fleet, or vehicle in a knowledge portal that provides partial or complete resources for information on some or all regulatory and business requirements for those operating within the industry, regardless of their role, or registration with the platform; and
said records framework ensures registrants are able to maintain, validate, organize, summarize, and apply vehicle movement records within and across fleets.

13. The apparatus according to claim 1, wherein:
said records platform includes a records framework that enables motor carriers to view historical, current, or planned records of vehicle movement for operational and fleet optimization; and
said records framework enable drivers to maintain service records to comply with national, federal, other jurisdictional, or contractual or procedural requirements of motor carriers, registrants, or shippers as well as maintain logs in association with vehicle movement records in order to meet record keeping requirements.

14. The apparatus according to claim 1, wherein:
said records platform includes a records framework that enables shippers to use historical or planning-assignment information to optimize fleet and inter-fleet cargo movements;
said records framework enables governmental and educational institutions to use a detailed or a summarized record for highway facility analysis and planning; and
said record framework enables comprehensive records to be recorded, stored and maintained against specific vehicles and users.

15. The apparatus according to claim 1, wherein:
said relational user framework enables data stored within the record framework to be accessible where needed for association with records stored against user profiles within the apparatus;
said relational user framework enables one or more users to contact one or more other users in context to the user's role within a transportation industry and one or more connections within their businesses; and
said relational user framework accesses government safety statuses on motor carriers, drivers and registrants.

16. The apparatus according to claim 1, wherein:
said relational user framework provides potential business associates with assurances that new or potential employees/employers are permitted to operate in their appropriate field based upon government held safety records; and
access to government safety statuses on motor carrier, drivers and registrants is managed via the external connection manager and any relevant information is then filtered by the relational user framework.

17. The apparatus according to claim 1, wherein:
abstraction of data collected by the external connection manager enables combinations of multiple datasets from externals sources to be combined into a predetermined data structure in which data is stored in the database; and
said external connection manager enables integration of external data sources to produce records in conjunction with a platform records generation service and integration and consumption of government data through integration with government databases.

18. The apparatus according to claim 1, wherein:
a configurability of the external connection manager allows for evolutionary integration with other external data sources as governmental requirements and systems emerge; and
structured data in the database enable aggregated, summarized, reported or transmitted records for fleet, driver, shipper, or other attributes as required.

19. The apparatus according to claim 1, wherein:
the external connection manager enables development and licensing of application programming interfaces (APIs, to include real time, batch, and heterogeneous methods) for records request by an external agency and records release by motor carriers, drivers or registrants;
new external connections can be introduced via configuration of the external connection manager; and
abstraction of data collected by the external connection manager enables combinations of multiple datasets from externals sources to be combined into a predetermined data structure.

20. The apparatus according to claim 1, wherein:
said knowledge portal provides a single point of information access for all stakeholders within a transportation industry;
said knowledge portal remembers a visitor's visits to knowledge portal to enable a focused and tailored experience on subsequent visits; and
said knowledge portal provides a complete resource for information on all regulatory and business requirements for those operating within an industry, regardless of their role, or registration with the platform.

* * * * *